(12) United States Patent
Dudar

(10) Patent No.: US 10,138,846 B1
(45) Date of Patent: Nov. 27, 2018

(54) SYSTEMS AND METHODS FOR AN EVAPORATIVE EMISSIONS SYSTEM AND FUEL SYSTEM HAVING A SINGLE DELTA PRESSURE SENSOR

(71) Applicant: Ford Global Technologies, LLC, Dearborn, MI (US)

(72) Inventor: Aed M. Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/722,957

(22) Filed: Oct. 2, 2017

(51) Int. Cl.
*F02M 25/08* (2006.01)
*F02D 41/22* (2006.01)
*B60K 15/035* (2006.01)

(52) U.S. Cl.
CPC ... *F02M 25/0809* (2013.01); *B60K 15/03504* (2013.01); *B60K 15/03519* (2013.01); *F02D 41/22* (2013.01); *F02M 25/0836* (2013.01); *F02D 2041/225* (2013.01); *F02M 2025/0845* (2013.01)

(58) Field of Classification Search
CPC ........... F02M 25/0809; F02M 25/0836; F02M 2025/0845; F02D 41/22; F02D 2041/225; B60K 15/03519; B60K 15/03504
USPC ................................ 123/519, 518, 520, 516
See application file for complete search history.

(56) References Cited

U.S. PATENT DOCUMENTS

| 5,182,945 A * | 2/1993 | Setter | F02M 25/0809 73/114.39 |
| 5,443,051 A * | 8/1995 | Otsuka | F02M 25/0809 123/198 D |
| 6,105,556 A * | 8/2000 | Takaku | F02M 25/0809 123/198 D |
| 6,637,261 B1 * | 10/2003 | Beneker | F02M 25/0809 73/114.38 |
| 2012/0211087 A1 | 8/2012 | Dudar et al. | |
| 2016/0313171 A1 * | 10/2016 | Dudar | G01F 23/32 |

OTHER PUBLICATIONS

"Media Isolated Pressure Sensors," TE Connectivity Website, Available online at https://web.archive.org/web/20170403174724/http://www.te.com/usa-en/products/sensors/pressure-sensors/media-isolated-pressure-sensors.html?tab=pgp-story, Available as Early as Apr. 3, 2017, 3 pages.

* cited by examiner

*Primary Examiner* — Mahmoud Gimie
(74) *Attorney, Agent, or Firm* — Julia Voutyras; McCoy Russell LLP

(57) ABSTRACT

Methods and systems are provided for including a single pressure sensor in an evaporative emissions system and fuel system. In one example, a method may include measuring a differential pressure between the evaporative emissions system and the fuel system using a delta pressure sensor coupled across a fuel tank isolation valve disposed between a fuel vapor storage canister of the evaporative emissions system and a fuel tank of the fuel system. Each of the fuel tank isolation valve, the fuel system, and the evaporative emissions system may be checked for degradation using the differential pressure measured by the delta pressure sensor.

20 Claims, 13 Drawing Sheets

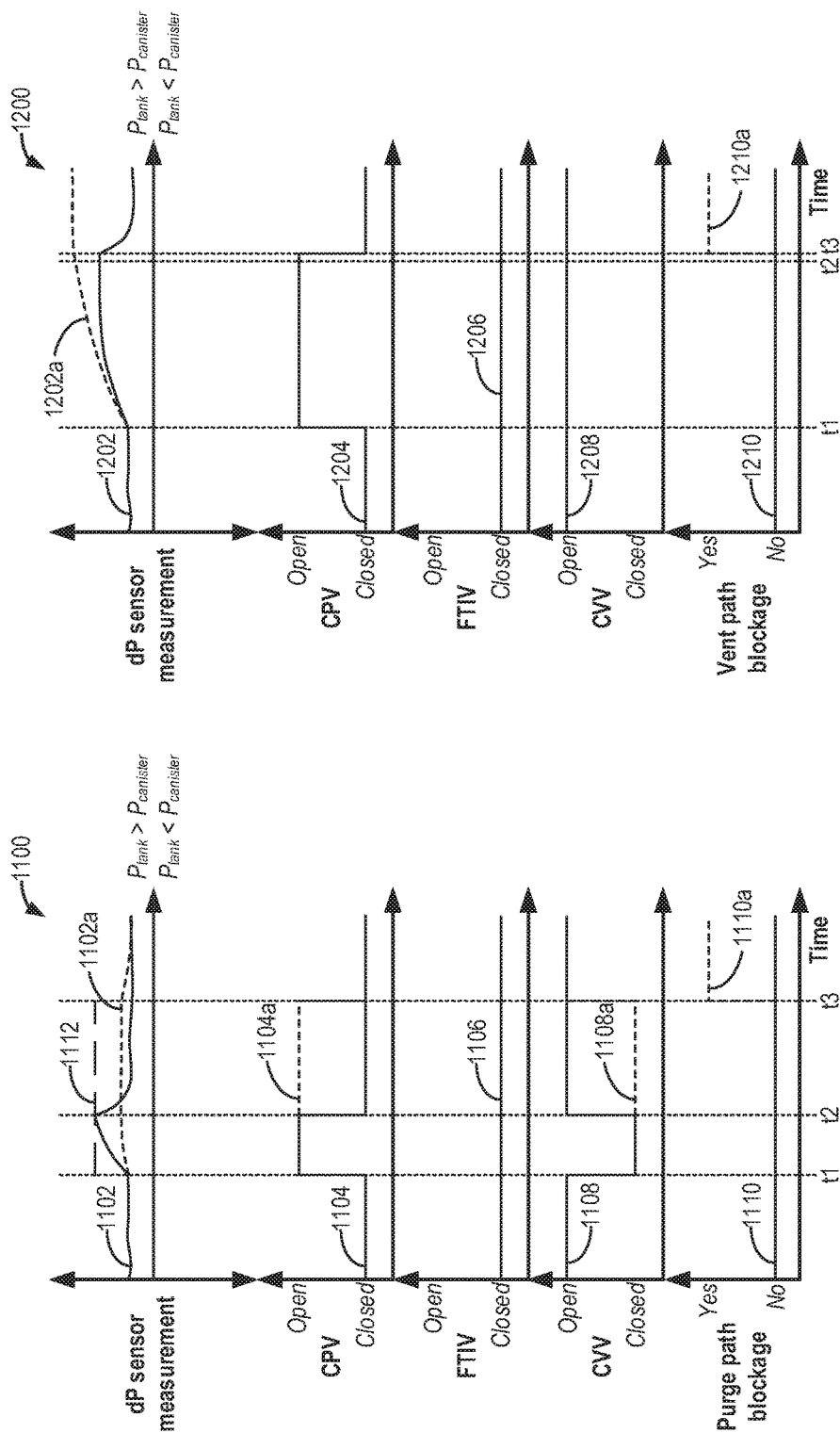

SYSTEMS AND METHODS FOR AN EVAPORATIVE EMISSIONS SYSTEM AND FUEL SYSTEM HAVING A SINGLE DELTA PRESSURE SENSOR

FIELD

The present description relates generally to methods and systems for a non-integrated refueling canister only system.

BACKGROUND/SUMMARY

A vehicle fuel system may include an evaporative emissions system designed to reduce the release of fuel vapors to the atmosphere. For example, vaporized hydrocarbons (HCs) from a fuel tank may be stored in a fuel vapor storage canister packed with an adsorbent that adsorbs and stores the vapors. At a later time, when the engine is in operation, the fuel vapors may be purged from the evaporative emissions system into an engine intake manifold for use as fuel. In some examples, the evaporative emissions system may be configured to store refueling vapors, running loss vapor, and diurnal vapors. However, in other examples, the evaporative emissions system and fuel system may be configured as a non-integrated refueling canister only system (NIRCOS). In such a system, the fuel tank is sealed, and fuel vapors are only routed to the fuel vapor storage canister during a refueling event. For example, a plug-in hybrid electric vehicle (PHEV) may include a NIRCOS due to limited engine run time. If the fuel tank were vented, prolonged electric mode driving (in which the engine is off and the vehicle is propelled with torque from an electric motor) may result in the fuel vapor storage canister becoming overloaded and fuel vapors being emitted to the atmosphere.

In order to seal the fuel tank from the fuel vapor storage canister, the NIRCOS may include a fuel tank isolation valve (FTIV) between the fuel tank and the fuel vapor storage canister. For example, the FTIV may be a solenoid valve under control of a pulse-width modulated signal. The FTIV may be at least partially opened to regulate fuel tank pressure during engine-on conditions and to prepare the fuel tank for refueling (e.g., during engine-off conditions). Typically, a pressure sensor is coupled to the fuel system (such as a fuel tank pressure transducer coupled to the fuel tank) in order to measure a fuel tank pressure. An additional pressure sensor may be included on the fuel vapor storage canister-side of the FTIV in order to monitor for degradation in the evaporative emissions system.

However, the inventor herein has recognized that including two pressure sensors in the NIRCOS may increase the cost of the system and lead to multiple points of degradation, as each sensor may independently degrade. Costs and complexity may be reduced by eliminating one of the sensors. However, including only the fuel tank pressure sensor (and eliminating the fuel vapor storage canister-side pressure sensor) would require the FTIV to be opened to test for degradation in the fuel vapor storage canister-side of the evaporative emissions system, which would not allow only refueling vapors to load the fuel vapor storage canister. In another example, eliminating the fuel tank pressure sensor would result in a lack of knowledge about the fuel tank pressure, which might degrade fuel tank pressure control when the engine is running as well as fuel tank depressurization during a refueling event.

The inventor herein has recognized that a single delta pressure sensor may be coupled across the FTIV, thereby reducing the cost/complexity of the NIRCOS and the overall cost of the vehicle while still enabling detection of both evaporative emissions system and fuel system degradation.

In one example, the issues described above may be addressed by a method, comprising: differentiating degradation between each of a sealed fuel tank, an evaporative emissions system, and a fuel tank isolation valve (FTIV) based on a differential pressure measured by a delta pressure sensor coupled across the FTIV, the FTIV positioned between the sealed fuel tank and the evaporative emissions system. In this way, a single delta pressure sensor may be used to identify degradation in the evaporative emissions system, the fuel system, and/or the FTIV.

As one example, a first pressure port of the delta pressure sensor may be fluidically coupled to a conduit between the FTIV and the sealed fuel tank, and a second pressure port of the delta pressure sensor may be fluidically coupled to the conduit between the FTIV and a fuel vapor storage canister of the evaporative emissions system. With no restricting components, such as valves, present between the sealed fuel tank and the first pressure port and/or the fuel vapor storage canister and the second pressure port, the differential pressure measured by the delta pressure sensor indicates a relative pressure (or vacuum) of the evaporative emissions system as well as a relative pressure (or vacuum) of the sealed fuel tank. For example, the relative pressure (or vacuum) of the evaporative emissions system is relative to a pressure of the sealed fuel tank, and the relative pressure (or vacuum) of the sealed fuel tank is relative to a pressure of the evaporative emissions system. In this way, a change in differential pressure measured by the delta pressure sensor may be used to detect evaporative emissions system degradation during, for example, a canister-side engine off test, and the relative pressure (or vacuum) of the sealed fuel tank may be used to detect and differentiate between fuel system and FTIV degradation, such as when the fuel tank is not completely sealed. With only one delta pressure sensor included for both the evaporative emissions system and the fuel system, vehicle costs, complexity, and points of degradation may be reduced.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 11 is a prophetic example timeline for determining if a purge path blockage is present in an evaporative emissions system based on output from a single delta pressure sensor.

FIG. 12 is a prophetic example timeline for determining if a vent path blockage is present in an evaporative emissions system based on output from a single delta pressure sensor.

DETAILED DESCRIPTION

Figure 1:
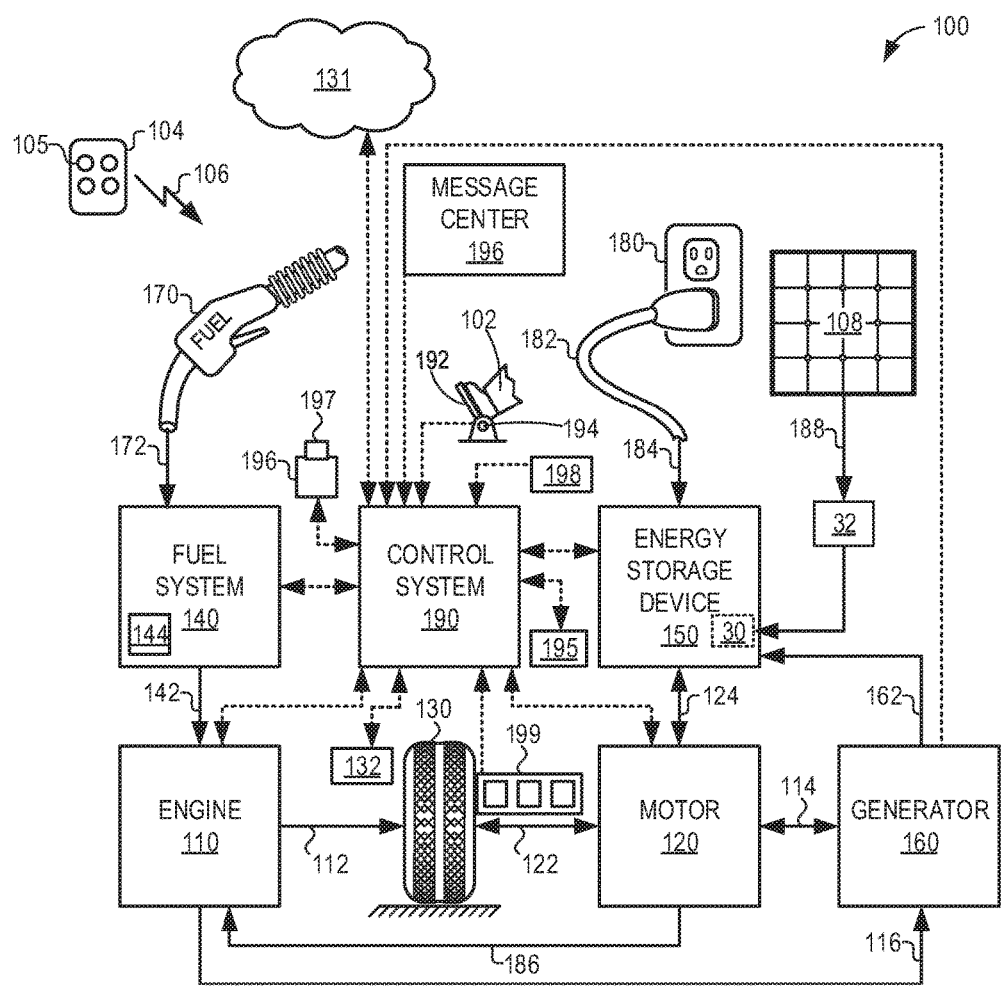
FIG. 1 schematically shows an example vehicle system.
Figure 2:
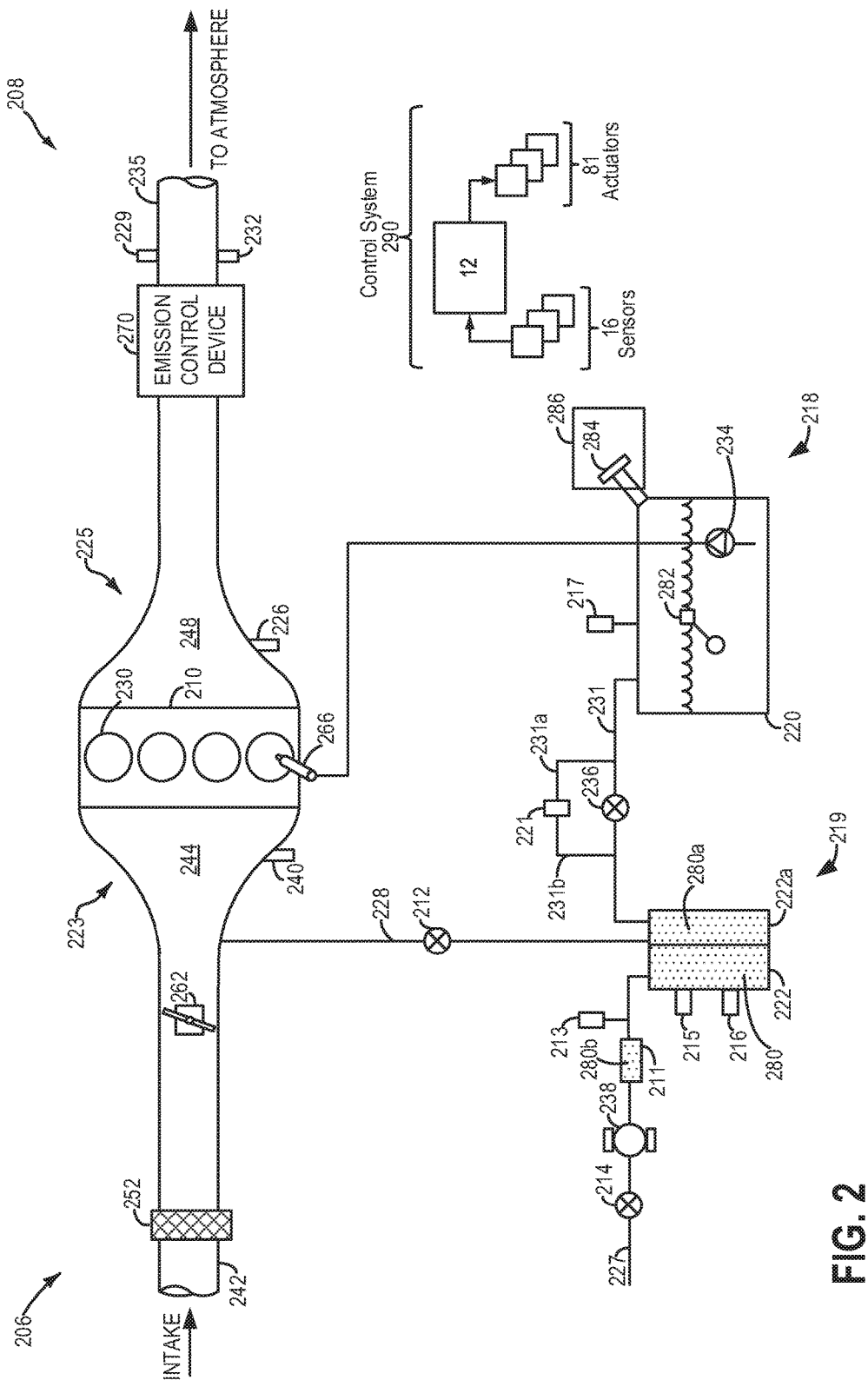
FIG. 2 shows a schematic depiction of a fuel system and evaporative emission system coupled to an engine system.
Figure 3:
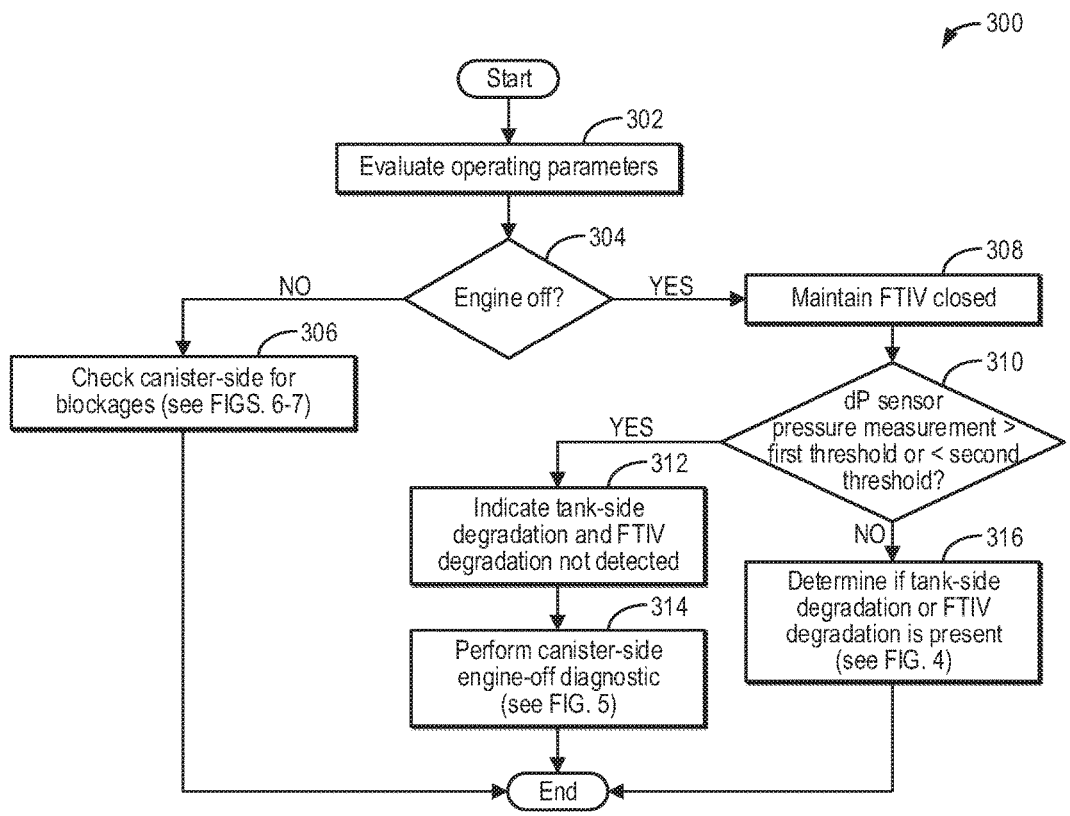
FIG. 3 shows a high-level flow chart of an example method for diagnosing components of a fuel system and evaporative emissions system using output from a delta pressure sensor coupled across a fuel tank isolation valve (FTIV).
Figure 9:
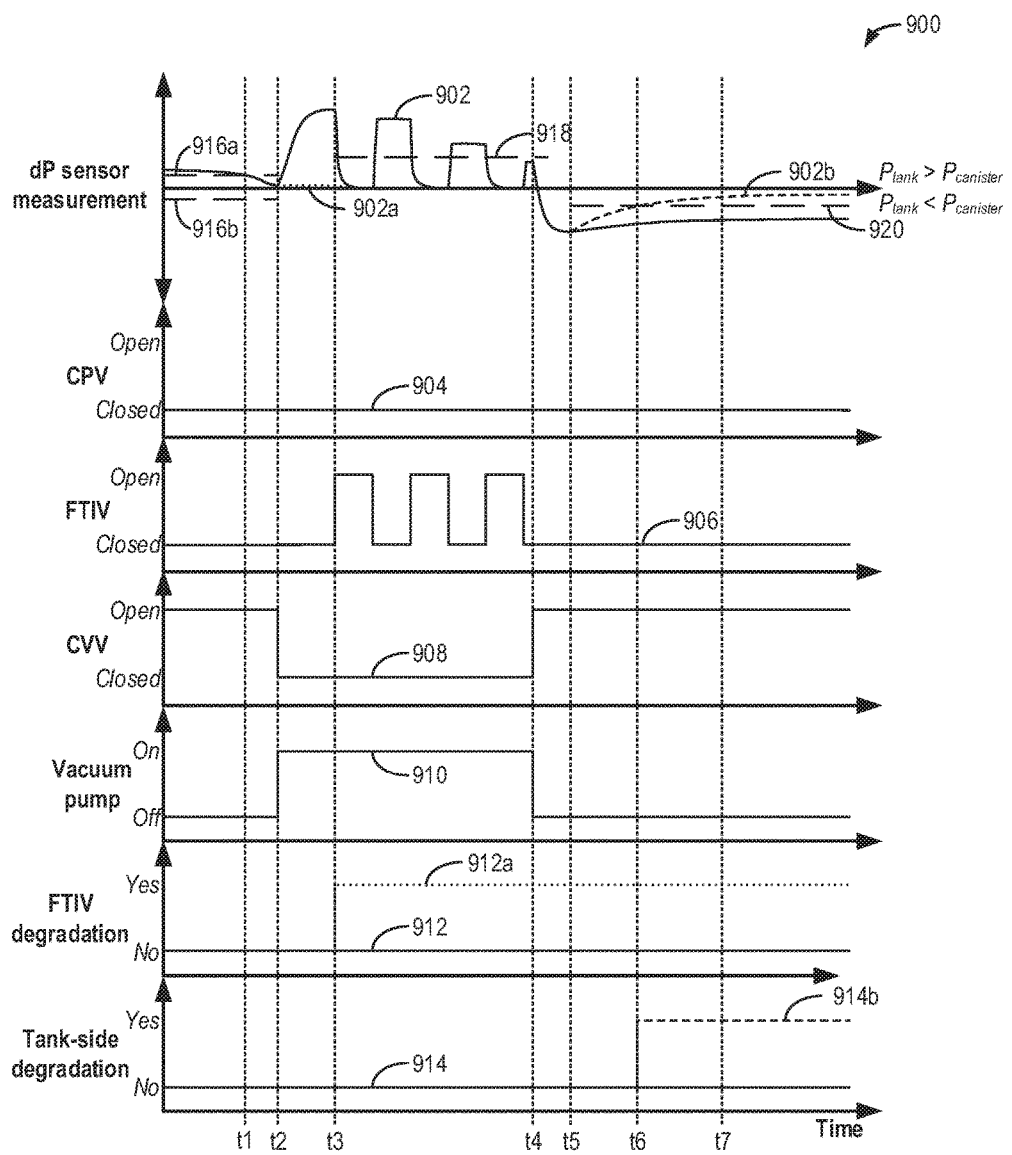
FIG. 9 is a prophetic example timeline for determining if degradation of the FTIV or the fuel tank-side of the FTIV is present using output from a single delta pressure sensor coupled across the FTIV.
Figure 10:
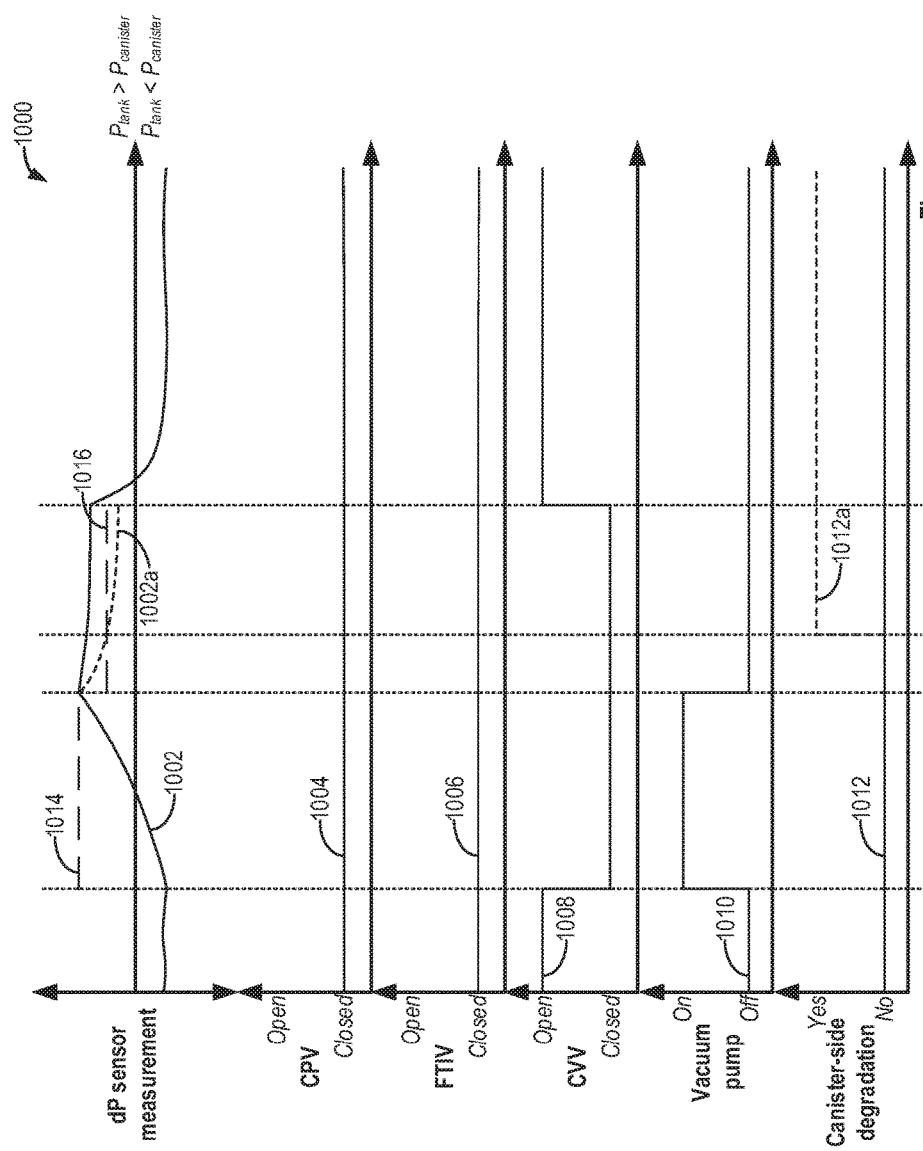
FIG. 10 is a prophetic example timeline for performing a diagnostic test on a fuel vapor storage canister-side of a FTIV using output from a single delta pressure sensor coupled across the FTIV.
Figure 13:
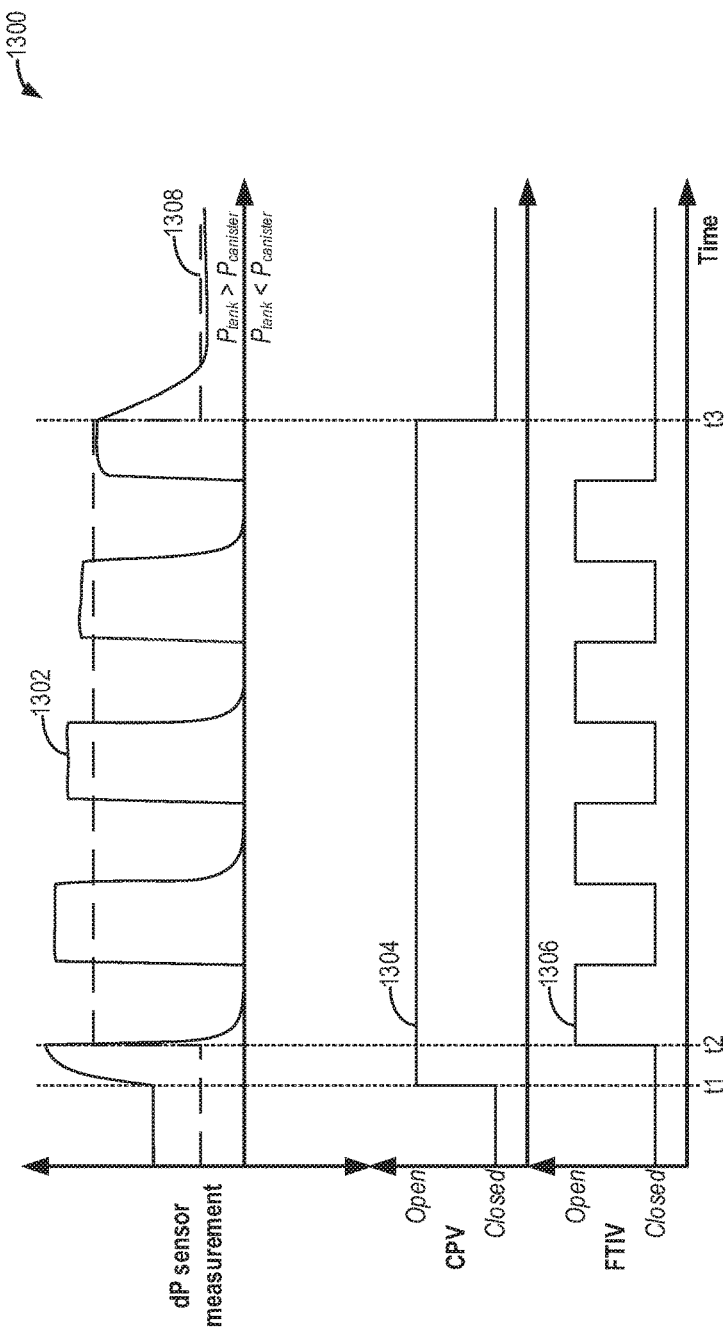
FIG. 13 is a prophetic example timeline for regulating pressure of a fuel tank-side of a FTIV based on measurements from a delta pressure sensor coupled across the FTIV.
Figure 14:
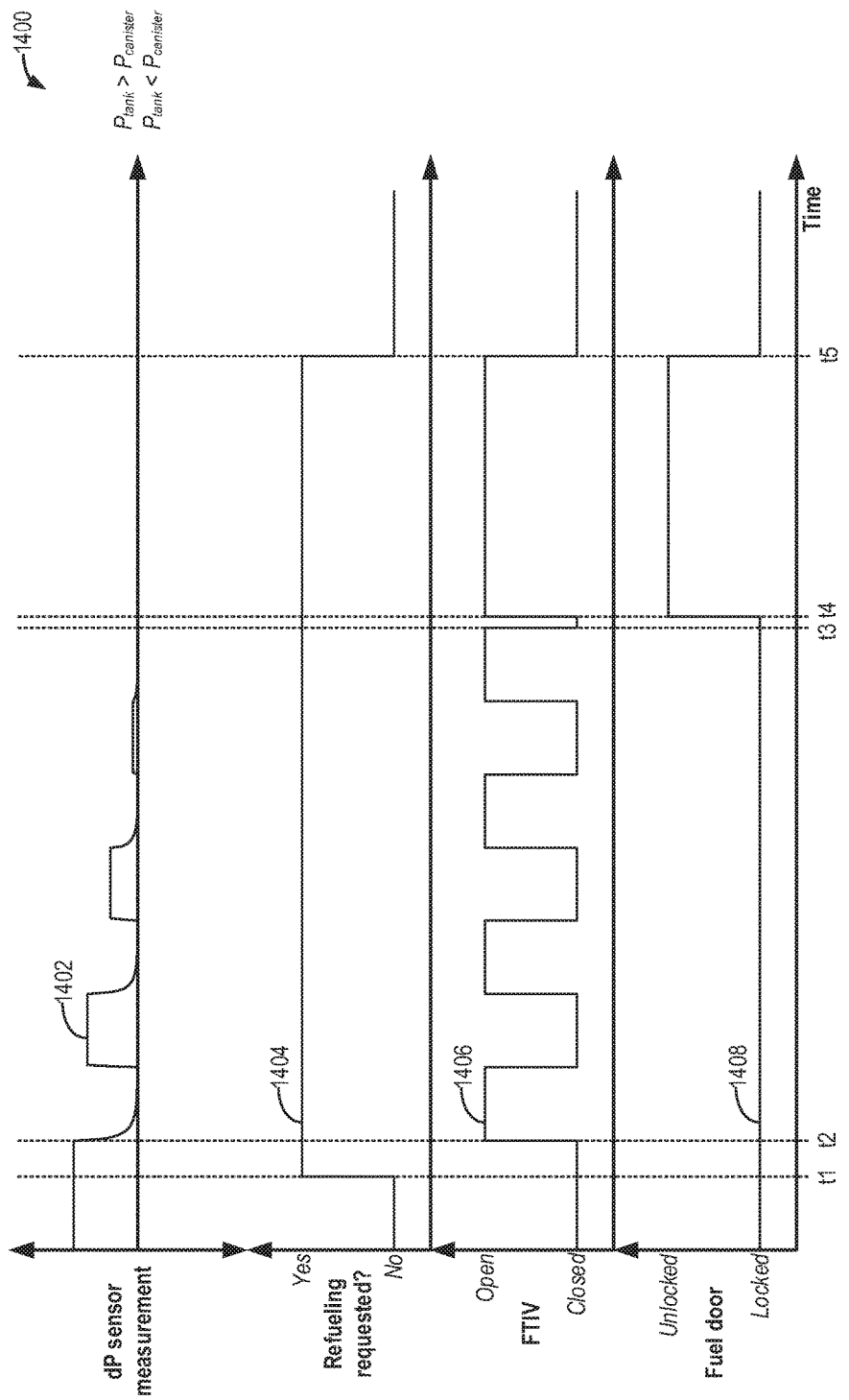
FIG. 14 is a prophetic example timeline for depressurizing a fuel tank for a refueling event using output from a delta pressure sensor.

The following description relates to systems and methods for measuring pressure in a fuel system and evaporative emissions system, such as the fuel system and evaporative emissions system shown in FIG. 2, using a single delta pressure (dP) sensor. The fuel system and evaporative emissions system may be included in a vehicle system, such as the vehicle system illustrated in FIG. 1. For example, the fuel system and evaporative emissions system may be a non-integrated refueling canister only system (NIRCOS) included in a plug-in hybrid electric vehicle (PHEV) in which a fuel tank of the fuel system is sealed and isolated from a fuel vapor storage canister of the evaporative emissions system by a fuel tank isolation valve (FTIV). FIG. 3 shows a high-level flow chart for identifying degradation of the fuel system and the evaporative emissions system based on output of the dP sensor and depending on whether an engine of the vehicle is on or off. More specifically, degradation of the FTIV and a fuel tank-side of the FTIV may be detected according to the example method of FIG. 4, and example of which is shown in the timeline of FIG. 9, and degradation of a fuel vapor storage canister-side of the FTIV may be detected according to the example method of FIG. 5, an example of which is shown in the timeline of FIG. 10. Further, the fuel vapor storage canister-side of the FTIV may be checked for blockages according to the example methods of FIGS. 6 and 7, as also illustrated in the example timelines of FIGS. 11 and 12. The pressure of the fuel tank may be regulated using output from the dP sensor in order to maintain the pressure of the fuel tank below a threshold pressure and to depressurize the tank during a refueling event, such as according to the example method of FIG. 8. An example timeline for fuel tank depressurization while the engine is running is shown in FIG. 13, and an example timeline for fuel tank depressurization for a refueling event while the engine is off is shown in FIG. 14.

As used herein, the term "vacuum" refers to negative pressure with respect to a reference pressure (such as atmospheric pressure), and the term "pressure" can refer to both negative and positive pressures with respect to a reference pressure.

FIG. 1 illustrates an example vehicle system 100. Vehicle system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g., gasoline) to produce an engine output while motor 120 may consume electrical energy to produce a motor output. As such, a vehicle with propulsion system 100 may be referred to as a hybrid electric vehicle (HEV).

Vehicle system 100 may utilize a variety of different operational modes depending on operating conditions encountered by the vehicle propulsion system. Some of these modes may enable engine 110 to be maintained in an off state (e.g., set to a deactivated state) where combustion of fuel at the engine is discontinued. For example, under select operating conditions, motor 120 may propel the vehicle via a drive wheel 130, as indicated by an arrow 122, while engine 110 is deactivated.

During other operating conditions, engine 110 may be set to a deactivated state (as described above) while motor 120 may be operated to charge an energy storage device 150. For example, motor 120 may receive wheel torque from drive wheel 130, as indicated by arrow 122, and may convert the kinetic energy of the vehicle to electrical energy for storage at energy storage device 150, as indicated by an arrow 124. This operation may be referred to as regenerative braking of the vehicle. Thus, motor 120 may function as a generator in some examples. However, in other examples, a generator 160 may instead receive wheel torque from drive wheel 130 and may convert the kinetic energy of the vehicle to electrical energy for storage at energy storage device 150, as indicated by an arrow 162. As an additional example, motor 120 may use energy stored at energy storage device 150 to crank engine 110 in a starting operation, as indicated by an arrow 186.

During still other operating conditions, engine 110 may be operated by combusting fuel received from a fuel system 140, as indicated by an arrow 142. For example, engine 110 may be operated to propel the vehicle via drive wheel 130, as indicated by an arrow 112, while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some examples, motor 120 may propel the vehicle via a first set of drive wheels and engine 110 may propel the vehicle via a second set of drive wheels.

In other examples, vehicle system 100 may be configured as a series type vehicle propulsion system, whereby the engine does not directly propel the drive wheels. Rather, engine 110 may be operated to power motor 120, which may in turn propel the vehicle via drive wheel 130, as indicated by arrow 122. For example, during select operating conditions, engine 110 may drive generator 160, as indicated by an arrow 116, which may in turn supply electrical energy to one or more of motor 120, as indicated by an arrow 114, or energy storage device 150, as indicated by arrow 162. As another example, engine 110 may be operated to drive motor 120, which may in turn function as a generator to convert the engine output to electrical energy. The electrical energy may be stored at energy storage device 150 for later use by the motor, for example.

Fuel system 140 may include one or more fuel storage tanks 144 for storing fuel on-board the vehicle. For example, fuel tank 144 may store one or more liquid fuels, including (but not limited to) gasoline, diesel, and alcohol fuels. In some examples, the fuel may be stored on-board the vehicle as a blend of two or more different fuels. For example, fuel tank 144 may be configured to store a blend of gasoline and ethanol (such as E10, E85, etc.) or a blend of gasoline and methanol (such as M10, M85, etc.), whereby these fuels or fuel blends may be delivered to engine 110 as indicated by arrow 142. Still other suitable fuels or fuel blends may be supplied to engine 110, where they may be combusted to produce an engine output (e.g., torque). The engine output may be utilized to propel the vehicle (as indicated by arrow 112) or to recharge energy storage device 150 via motor 120 or generator 160.

In some examples, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

A control system 190 may communicate with one or more of engine 110, motor 120, fuel system 140, energy storage device 150, and generator 160. Control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback.

Control system 190 may receive an indication of an operator requested output of the vehicle propulsion system from a vehicle operator 102. For example, control system 190 may receive sensory feedback from a pedal position sensor 194 concerning a position of a pedal 192. Pedal 192 may refer schematically to a brake pedal and/or an accelerator pedal that may be depressed by vehicle operator 102. Furthermore, in some examples, control system 190 may be in communication with a remote engine start receiver 195 (or transceiver) that receives wireless signals 106 from a key fob 104 having a remote start button 105. In other examples (not shown), a remote engine start may be initiated via a cellular telephone or a smartphone-based system where a user's telephone sends data to a server and the server communicates with the vehicle to start the engine.

Energy storage device 150 may periodically receive electrical energy from a power source 180 residing external to the vehicle (e.g., an external stationary power grid that is not part of the vehicle), as indicated by an arrow 184. As a non-limiting example, vehicle system 100 may be configured as a plug-in HEV, whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may be disconnected between power source 180 and energy storage device 150. Control system 190 may identify and/or control the amount of electrical energy stored at the energy storage device, which may be referred to as the state of charge (SOC).

In other examples, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle. In this way, motor 120 may propel the vehicle by utilizing an energy source other than the fuel utilized by engine 110.

In still other examples, vehicle system 100 may include one or more solar cells 108, operative to convert incident solar radiation into electrical energy. The solar cells 108 are electrically coupled to a solar battery 30 via a charge controller 32. Solar cells 108 and charge controller 32 are operative to supply electrical current for charging solar battery 30. In this example, solar battery 30 is housed within and electrically coupled to energy storage device 150, but in other configurations, solar battery 30 may be electrically coupled to energy storage device 150 while being housed separately. Solar battery 30 may thus be configured to provide or receive charge from energy storage device 150, depending on engine operating conditions, charge status, and battery requirement(s). In still other configurations, solar battery 30 may be both physically and electrically isolated from energy storage device 150. In some examples, solar battery 30 may be configured to independently supply charge directly to vehicle actuators and devices. In still further examples, charge controller 32 may be used to directly supply power to vehicle actuators and devices without requiring charge to first be stored in solar battery 30.

Solar cells 108 may be mounted on any convenient exterior surface of the vehicle, for example a vehicle roof, hood, trunk, etc. However, solar cells 108 may additionally or alternatively be mounted on the interior of the vehicle, such as on a dashboard or other passenger compartment surface in proximity to a window or interior light bulb. In general, the solar cells are operative to convert solar radiation incident thereon into electrical energy. In some embodiments, solar cells 108 may comprise a series of photovoltaic cells formed from an amorphous semi-conductor material, such as silicon. Additionally, individual photovoltaic cells may be interconnected so as to provide a constant flow of electrical energy to a common output cable 188, which electrically couples solar cells 108 to charge controller 32 and solar battery 30. In this way, solar cells 108 may generate electrical energy with which to propel the vehicle or power one or more additional vehicle actuators and devices, and motor 120 may propel the vehicle by utilizing an energy source other than the fuel utilized by engine 110.

Fuel system 140 may periodically receive fuel from a fuel source residing external to the vehicle. As a non-limiting example, vehicle system 100 may be refueled by receiving fuel via a fuel dispensing device 170, as indicated by an arrow 172. In some examples, fuel tank 144 may be configured to store the fuel received from fuel dispensing device 170 until it is supplied to engine 110 for combustion. Control system 190 may receive an indication of the level of fuel stored in fuel tank 144 via a fuel level sensor. The level of fuel stored in fuel tank 144 (e.g., as identified by the fuel level sensor) may be communicated to the vehicle operator, for example, via a fuel gauge or indication in a vehicle instrument panel (e.g., message center) 196.

The vehicle system 100 may also include an ambient temperature/humidity sensor 198 and a roll stability control sensor, such as a lateral and/or longitudinal and/or yaw rate sensor(s) 199. The vehicle instrument panel 196 may include indicator light(s) and/or a text-based display in which messages are displayed to an operator. The vehicle instrument panel 196 may also include various input devices for receiving an operator input, such as buttons, touch screens, voice input/recognition, etc. For example, the vehicle instrument panel 196 may include a refueling button 197, which may be manually actuated or pressed by the vehicle operator to initiate refueling. For example, as described in more detail below, in response to the vehicle operator actuating refueling button 197, a fuel tank in the vehicle (e.g., fuel tank 144) may be depressurized so that refueling may be performed.

Control system 190 may be communicatively coupled to other vehicles or infrastructures using various appropriate communications technologies. For example, control system 190 may be coupled to other vehicles or infrastructures via a wireless network 131, which may comprise Wi-Fi, Bluetooth, a type of cellular service, a wireless data transfer protocol, and so on. Control system 190 may broadcast (and receive) information regarding vehicle data, vehicle diagnostics, traffic conditions, vehicle location information, vehicle operating procedures, etc., via vehicle-to-vehicle (V2V), vehicle-to-infrastructure-to-vehicle (V2I2V), and/or vehicle-to-infrastructure (V2I or V2X) technology. Information exchanged between vehicles can be either directly communicated between vehicles or can be multi-hop. In some examples, longer range communications (e.g. WiMax) may be used in place of or in conjunction with V2V or V2I2V to extend the coverage area by a few miles. In still other examples, vehicle control system 190 may be communicatively coupled to other vehicles or infrastructures via wireless network 131 and the internet (e.g. the cloud).

Vehicle system 100 may also include an on-board navigation system 132, such as a Global Positioning System (GPS), that an operator of the vehicle may interact with. The navigation system 132 may include one or more location sensors for assisting in estimating vehicle speed, vehicle altitude, vehicle position/location, etc. This information may also be used to infer engine operating parameters, such as local barometric pressure. As discussed above, control system 190 may be further configured to receive information via the internet or other communication networks. Information received from the GPS may be cross-referenced to information available via the internet to determine local weather conditions, local vehicle regulations, etc.

FIG. 2 shows a schematic depiction of a vehicle system 206. It may be understood that vehicle system 206 may comprise the same vehicle system as vehicle system 100 depicted in FIG. 1. Vehicle system 206 may derive propulsion power from engine system 208 and/or an on-board energy storage device (such as energy storage device 150 shown in FIG. 1). An energy conversion device, such as a generator (e.g., generator 160 of FIG. 1), may be operated to absorb energy from vehicle motion and/or engine operation and convert the absorbed energy to an energy form suitable for storage by the energy storage device.

Engine system 208 may include an engine 210 having a plurality of cylinders 230. Engine 210 may be engine 110 shown in FIG. 1, for example. Engine 210 may include an engine intake system 223 and an engine exhaust system 225. Engine intake system 223 may include an intake throttle 262 fluidly coupled to an engine intake manifold 244 via an intake passage 242. Air may be routed to intake throttle 262 after passing through an air filter 252 coupled to intake passage 242 upstream of intake throttle 262. Engine exhaust system 225 includes an exhaust manifold 248 leading to an exhaust passage 235 that routes exhaust gas to the atmosphere. Engine exhaust system 225 may include an emission control device 270 mounted in a close-coupled position. Emission control device may include one or more of a three-way catalyst, a lean NOx trap, a particulate filter (e.g., a diesel particulate filter or a gasoline particulate filter), an oxidation catalyst, etc. It will be appreciated that other components may be included in the engine, such as a variety of valves and sensors, as further elaborated in herein. In some embodiments, wherein engine system 208 is a boosted engine system, the engine system may further include a boosting device, such as a turbocharger (not shown).

Engine system 208 is coupled to a fuel system 218 and an evaporative emissions system 219. Fuel system 218 includes a fuel tank 220 coupled to a fuel pump 234, the fuel tank supplying a fuel to engine 210 that propels vehicle system 206. Evaporative emissions system 219 includes a fuel vapor storage canister 222. During a fuel tank refueling event, fuel may be pumped into the vehicle from an external source through a refueling port 284, and fuel vapors may be routed to fuel vapor storage canister 222, as further described below. A fuel door 286 may prevent access to refueling port 284 when in a closed position. Fuel door 286 may be normally locked in the closed position so that fuel door 286 may not be opened. Fuel door 286 may be unlocked during the fuel tank refueling event in response to a determination that fuel tank 220 is depressurized, as will be described with respect to FIG. 8. When unlocked, fuel door 286 may be opened to enable access to refueling port 284. Fuel tank 220 may hold a plurality of fuel blends, including fuel with a range of alcohol concentrations, such as various gasoline-ethanol blends, including E10, E85, gasoline, etc., and combinations thereof. A fuel level sensor 282 located in fuel tank 220 may provide an indication of a fuel level ("Fuel Level Input") to a controller 12 of a control system 290 (which may be control system 190 of FIG. 1, for example). As depicted, fuel level sensor 282 may comprise a float connected to a variable resistor. Alternatively, other types of fuel level sensors may be used.

Fuel pump 234 is configured to deliver pressurized fuel to fuel injectors of engine 210, such as an example fuel injector 266. While only a single fuel injector 266 is shown, additional fuel injectors may be provided for each cylinder. It will be appreciated that fuel system 218 may be a return-less fuel system, a return fuel system, or various other types of fuel system. Vapors generated in fuel tank 220 may be routed to fuel vapor storage canister 222 via a conduit 231 for storage before being purged to the engine intake system 223. Thus, fuel system 218 may be in fluidic communication with evaporative emissions system 219.

Fuel vapor storage canister 222 is filled with an appropriate adsorbent 280 for temporarily trapping fuel vapors (including vaporized hydrocarbons) generated during fuel tank refueling operations. In one example, adsorbent 280 is activated charcoal (e.g., carbon). While a single fuel vapor storage canister 222 is shown, it will be appreciated that fuel system 218 and evaporative emissions system 219 may include any number of fuel vapor storage canisters. When purging conditions are met, such as when the fuel vapor storage canister is saturated, vapors stored in fuel vapor storage canister 222 may be purged to engine intake system 223 via a purge line 228 by opening a canister purge valve (CPV) 212, which may be a normally closed valve. In one example, canister purge valve 212 may be a solenoid valve, wherein opening or closing of the valve is performed via actuation of a canister purge solenoid.

Fuel vapor storage canister 222 may include a buffer 222a (or buffer region), each of the fuel vapor storage canister and the buffer comprising adsorbent. For example, buffer 222a is shown packed with an adsorbent 280a. As shown, the volume of buffer 222a may be smaller than (e.g., a fraction of) the volume of fuel vapor storage canister 222. Adsorbent 280a in the buffer 222a may be same as or different from adsorbent 280 in the fuel vapor storage canister (e.g., both may include charcoal). Buffer 222a may be positioned within fuel vapor storage canister 222 such that during fuel vapor storage canister loading, fuel tank vapors are first adsorbed within the buffer, and then when the buffer is saturated, further fuel tank vapors are adsorbed in the fuel vapor storage canister. In comparison, during fuel vapor storage canister purging, fuel vapors are first desorbed from the fuel vapor storage canister (e.g., to a threshold amount) before being desorbed from the buffer. In other words, loading and unloading of the buffer is not linear with the loading and unloading of the fuel vapor storage canister. As such, the effect of the fuel vapor storage canister buffer is to dampen any fuel vapor spikes flowing from the fuel tank to the fuel vapor storage canister, thereby reducing the possibility of any fuel vapor spikes going to the engine.

Fuel vapor storage canister 222 includes a vent 227 for routing gases out of the fuel vapor storage canister 222 to the atmosphere when storing fuel vapors from fuel tank 220. Vent 227 may also allow fresh air to be drawn into fuel vapor storage canister 222 when purging stored fuel vapors to engine intake 223 via purge line 228 and canister purge valve 212. While this example shows vent 227 communicating with fresh, unheated air, various modifications may also be used. In some examples, an air filter may be coupled to vent 227. Vent 227 may include a canister vent valve (CVV) 214 to adjust a flow of air and vapors between fuel vapor storage canister 222 and the atmosphere. When included, the vent valve may be a normally open valve so that air, stripped of fuel vapor after having passed through the fuel vapor storage canister, can be pushed out to the atmosphere (for example, during refueling while the engine is off). Likewise, during purging operations (for example, during fuel vapor storage canister regeneration and while the engine is running), the fuel vapor storage canister vent valve may be opened to allow a flow of fresh air to strip the fuel vapors stored in the fuel vapor storage canister. In one example, canister vent valve 214 may be a solenoid valve wherein opening or closing of the valve is performed via actuation of a canister vent solenoid. In particular, canister vent valve 214 may be a normally open valve that is closed upon actuation of the canister vent solenoid.

Evaporative emissions system 219 may further include a bleed fuel vapor storage canister 211. Hydrocarbons that desorb from fuel vapor storage canister 222 (hereinafter also referred to as the "main fuel vapor storage canister") may be adsorbed within the bleed fuel vapor storage canister. Bleed fuel vapor storage canister 211 may include an adsorbent material 280b that is different than the adsorbent material included in main fuel vapor storage canister 222. Alternatively, the adsorbent material in bleed fuel vapor storage canister 211 may be the same as that included in main fuel vapor storage canister 222 (e.g., adsorbent 280 may be the same as adsorbent material 280b).

A hydrocarbon (HC) sensor 213 may be present in evaporative emissions system 219 to indicate the concentration of hydrocarbons in vent 227. As illustrated, hydrocarbon sensor 213 is positioned between main fuel vapor storage canister 222 and bleed fuel vapor storage canister 211. A probe (e.g., sensing element) of hydrocarbon sensor 213 is exposed to and senses the hydrocarbon concentration of fluid flow in vent 227. Hydrocarbon sensor 213 may be used by control system 290 for determining breakthrough of hydrocarbon vapors from main fuel vapor storage canister 222, in one example.

One or more temperature sensors 215 may be coupled to and/or within fuel vapor storage canister 222. As fuel vapor is adsorbed by the adsorbent in the fuel vapor storage canister, heat is generated (heat of adsorption). Likewise, as fuel vapor is desorbed by the adsorbent in the fuel vapor storage canister, heat is consumed. In this way, the adsorption and desorption of fuel vapor by the fuel vapor storage canister may be monitored and estimated based on temperature changes within the fuel vapor storage canister. Further, one or more canister heating elements 216 may be coupled to and/or within fuel vapor storage canister 222. Canister heating element 216 may be used to selectively heat the fuel vapor storage canister (and the adsorbent contained within), for example, to increase desorption of fuel vapors prior to performing a purge operation. As described above, heating the fuel vapor storage canister may be particularly beneficial for purging hydrocarbon heavy ends (e.g., higher molecular weight hydrocarbons). Canister heating element 216 may comprise an electric heating element, such as a conductive metal, ceramic, or carbon element that may be heated electrically. In some embodiments, canister heating element 216 may comprise a source of microwave energy or may comprise a fuel vapor storage canister jacket coupled to a source of hot air or hot water. Canister heating element 216 may be coupled to one or more heat exchangers that may facilitate the transfer of heat, (e.g., from hot exhaust) to fuel vapor storage canister 222. Canister heating element 216 may be configured to heat air within fuel vapor storage canister 222 and/or to directly heat the adsorbent located within fuel vapor storage canister 222. In some embodiments, canister heating element 216 may be included in a heater compartment coupled to the interior or exterior of fuel vapor storage canister 222. In some embodiments, fuel vapor storage canister 222 may be coupled to one or more cooling circuits and/or cooling fans. In this way, fuel vapor storage canister 222 may be selectively cooled to increase adsorption of fuel vapors (e.g., prior to a refueling event). In some examples, canister heating element 216 may comprise one or more Peltier elements, which may be configured to selectively heat or cool fuel vapor storage canister 222.

Hybrid vehicle system 206 may have reduced engine operation times due to the vehicle being powered by engine system 208 during some conditions and by the energy storage device under other conditions. While the reduced engine operation times reduce overall carbon emissions from the vehicle, they may also lead to insufficient purging of fuel vapors from evaporative emissions system 219. Further, due to the reduced engine operation times, fuel may be consumed slowly. For example, the fuel housed in fuel tank 220 may last for a relatively long duration (e.g., months to a year) without any refueling events. If fuel tank 220 were regularly vented, such as vented to evaporative emissions system 219 via conduit 231, the fuel in fuel tank 220 may become aged and lose its volatility, such as through lower molecular weight hydrocarbons (e.g., light ends) escaping to the fuel vapor storage canister. As a result, fuel vapor storage canister 222 may become overloaded, and when the aged fuel is used for combustion in the engine, engine performance may be degraded. For example, the decrease in fuel volatility may cause long and polluting starts.

To address this, a fuel tank isolation valve (FTIV) 236 may be included in conduit 231 such that fuel tank 220 is coupled to canister 222 via the valve. In some examples, the FTIV may also be a tank pressure control (TPC) valve. When closed, FTIV 236 may seal fuel tank 220 from evaporative emissions system 219 and the atmosphere. Thus, fuel tank 220 may be comprised of a suitable material (e.g., steel) to withstand pressure changes, such as 5 PSI of pressure or vacuum (relative to atmospheric pressure). FTIV 236 may be a normally closed valve to prevent diurnal or "running loss" vapors from being directed to canister 222 from fuel tank 220. During refueling operations, FTIV 236 may be temporarily opened to direct fuel vapors from fuel tank 220 to fuel vapor storage canister 222, as will be described below with respect to FIG. 8. Further, FTIV 236 may also be temporarily opened when the fuel tank pressure is higher than a threshold (e.g., above a mechanical pressure limit of the fuel tank), such that fuel vapors may be released into the fuel vapor storage canister and the fuel tank pressure maintained below the threshold, as also described with respect to FIG. 8. Further still, FTIV 236 may be opened at a predetermined duty cycle in order to detect FTIV degradation and/or degradation in fuel system 218 (e.g., a fuel tank-side of FTIV), as will be described below with respect to FIG. 4. In some examples, a vacuum pump 238 may be included in vent 227 to evacuate the evaporative emissions system and facilitate in the detection, as will be elaborated below.

A delta (e.g., differential) pressure sensor (e.g., dP sensor) 221 may be coupled to fuel system 218 and evaporative emissions system 219 across FTIV 236. In one example, dP sensor 221 is the only pressure sensor included in fuel system 218 and evaporative emissions system 219, with no absolute pressure sensor included. A first conduit 231a may fluidly couple a first pressure port of dP sensor 221 to conduit 231 on the fuel tank-side of FTIV, and a second conduit 231b may fluidly couple a second pressure port of dP sensor 221 to conduit 231 on a fuel vapor storage canister-side of FTIV. The dP sensor 221 may be a media isolated pressure sensor, for example. A pressure-sensitive diaphragm, such as a stainless steel, titanium, or nickel alloy diaphragm, may be included within dP sensor 221 between the first and second pressure ports to separate the two media (e.g., fuel vapors at the first pressure port and fresh air at the second pressure port). The dP sensor 221 may generate a voltage proportional to the delta pressure (e.g., the pressure differential) between the first pressure port, which corresponds to the pressure of fuel system 218 (and fuel tank 220), and the second pressure port, which corresponds to the pressure of evaporative emissions system 219 (e.g., the pressure of the fuel vapor storage canister-side of FTIV 236). When FTIV 236 is open, the pressure at the first pressure port is the same as the pressure at the second pressure port of dP sensor 221. Without a pressure difference, dP sensor 221 may output a small voltage (e.g., 0.45-1.0 V) equivalent to a 0 in $H_2O$ pressure differential. When FTIV 236 is closed, the pressure at the first port may be determined relative to the pressure at the second port (and vice versa). As one example, when CVV 214 is open and CPV 212 is closed, the fuel vapor storage canister-side (also referred to herein as the canister-side) may be at atmospheric pressure, and therefore, dP sensor 221 may provide an indication of the pressure of fuel tank 220 relative to atmospheric pressure. As another example, during purging of fuel vapor storage canister 222 when CVV 214 is open and CPV 212 is open, vacuum from engine intake manifold 244 may reduce the pressure of the canister-side of FTIV 236, and this pressure reduction may be indicated by dP sensor 221 relative to the pressure of fuel tank 220 (e.g., the pressure of the fuel tank-side of FTIV 236). In still other examples, control system 290 may diagnose components of the fuel system and evaporative emissions system based on the differential pressure measured by dP sensor 221, as described below with respect to FIGS. 3-7.

One or more temperature sensors 217 may also be coupled to fuel system 218 for providing an estimate of a fuel system temperature. In one example, the fuel system temperature is a fuel tank temperature, wherein temperature sensor 217 is a fuel tank temperature sensor coupled to fuel tank 220. While the depicted example shows temperature sensor 217 directly coupled to fuel tank 220, in alternate embodiments, the temperature sensor may be coupled between fuel tank 220 and FTIV 236.

Fuel vapors released from fuel vapor storage canister 222, such as during a purging operation, may be directed into engine intake manifold 244 via purge line 228. The flow of vapors along purge line 228 may be regulated by canister purge valve 212, coupled between the fuel vapor storage canister and the engine intake. The quantity and rate of vapors released by CPV 212 may be determined by the duty cycle of an associated canister purge valve solenoid (not shown). As such, the duty cycle of the canister purge valve solenoid may be determined by controller 12 responsive to engine operating conditions, including, for example, engine speed-load conditions, an air-fuel ratio, a fuel vapor storage canister load, etc. By commanding the canister purge valve to be closed, the controller may seal evaporative emissions system 219 from the engine intake. An optional canister check valve (not shown) may be included in purge line 228 to prevent intake manifold pressure from flowing gases in the opposite direction of the purge flow. As such, the check valve may be beneficial if the canister purge valve control is not accurately timed or the canister purge valve itself can be forced open by a high intake manifold pressure. An estimate of the manifold absolute pressure (MAP) or manifold vacuum (ManVac) may be obtained by controller 12 from a MAP sensor 240 coupled to engine intake manifold 244. Alternatively, MAP may be inferred from alternate engine operating conditions, such as mass air flow (MAF), as measured by a MAF sensor (not shown) coupled to the intake manifold.

Fuel system 218 and evaporative emissions system 219 may be operated by controller 12 in a plurality of modes by selectively adjusting the various valves and solenoids. For example, the fuel system and evaporative emissions system may be operated in a fuel vapor storage mode (e.g., while the engine is not running), wherein the controller 12 may maintain CVV 214 open while maintaining CPV 212 and FTIV 236 closed. In this way, fuel vapors may be prevented from flowing from fuel tank 220 to fuel vapor storage canister 222 and from fuel vapor storage canister 222 to engine intake manifold 244. As another example, the fuel system and the evaporative emissions system may be operated in a refueling mode (e.g., when fuel tank refueling is requested by a vehicle operator), wherein the controller 12 may open FTIV 236 while maintaining CVV 214 open and CPV 212 closed to depressurize the fuel tank before enabling fuel to be added therein. As such, FTIV 236 may be kept open during the refueling operation to allow refueling vapors to be stored in the fuel vapor storage canister. After refueling is completed, FTIV 236 may be closed. As yet another example, the fuel system and the evaporative emissions system may be operated in a canister purging mode (e.g., after an emission control device light-off temperature has been attained and with the engine running), wherein the controller 12 may open CPV 212 while maintaining CVV 214 open and FTIV 236 closed. The vacuum generated by engine intake manifold 244 may be used to draw fresh air through vent 227 and through fuel vapor storage canister 222 to purge the stored fuel vapors into engine intake manifold 244. In this mode, the purged fuel vapors from the canister are combusted in the engine. The purging may be continued until the stored fuel vapor amount in the canister is below a threshold.

During purging, the learned vapor amount/concentration may be used to determine the amount of fuel vapors stored in the fuel vapor storage canister, and then during a later portion of the purging operation (when the fuel vapor storage canister is sufficiently purged or empty), the learned vapor amount/concentration may be used to estimate a loading state of the fuel vapor storage canister. For example, one or more oxygen sensors (not shown) may be coupled to the fuel vapor storage canister 222 (e.g., downstream of the fuel vapor storage canister) or positioned in the engine intake and/or engine exhaust to provide an estimate of a fuel vapor storage canister load (that is, an amount of fuel vapors stored in the fuel vapor storage canister). Based on the fuel vapor storage canister load and further based on engine operating conditions, such as engine speed-load conditions, a purge flow rate may be determined.

Control system 290 is shown receiving information from a plurality of sensors 16 (various examples of which are described herein) and sending control signals to a plurality of actuators 81 (various examples of which are also described herein). As one example, sensors 16 may include an exhaust gas sensor 226 located upstream of emission control device 270, a temperature sensor 232 coupled to exhaust passage 235, MAP sensor 240, temperature sensor 217, hydrocarbon sensor 213, dP sensor 221, and a pressure sensor 229 located downstream of emission control device 270. Other sensors, such as additional pressure, temperature, air/fuel ratio, and composition sensors, may be coupled to various locations in vehicle system 206. As another example, actuators 81 may include fuel injector 266, FTIV 236, CPV 212, CVV 214, fuel pump 234, vacuum pump 238, and intake throttle 262.

Control system 290 may further receive information regarding the location of the vehicle from an on-board global positioning system (GPS). Information received from the GPS may include vehicle speed, vehicle altitude, vehicle position, etc. This information may be used to infer engine operating parameters, such as local barometric (e.g., atmospheric) pressure. Control system 290 may further be configured to receive information via the internet or other communication networks. Information received from the GPS may be cross-referenced to information available via the internet to determine local weather conditions, local vehicle regulations, etc. Control system 290 may use the internet to obtain updated software modules, which may be stored in non-transitory memory.

Controller 12 of control system 290 may be configured as a conventional microcomputer, including a microprocessor unit, input/output ports, read-only memory, random access memory, keep alive memory, a controller area network (CAN) bus, etc. Controller 12 may be configured as a powertrain control module (PCM). The controller may be shifted between sleep and awake modes for additional energy efficiency. The controller may receive input data from the various sensors, process the input data, and trigger the actuators in response to the processed input data based on instruction or code programmed therein corresponding to one or more routines, examples of which are described with reference to FIGS. 3-8.

As mentioned above, in order to reduce vehicle costs, a single delta pressure sensor (e.g., dP sensor 221) may be included for measuring the relative pressures of a fuel system (e.g., fuel system 218 of FIG. 2) and an evaporative emissions system (e.g., evaporative emissions system 219 of FIG. 2) in a vehicle. More specifically, the dP sensor may be coupled across a fuel tank isolation valve (e.g., FTIV 236 of FIG. 2) that isolates the fuel system from the evaporative emissions system when closed. The output of the dP sensor, which is the difference in pressure between the fuel tank-side of the FTIV and the canister-side of the FTIV, may be used to detect FTIV degradation, detect fuel tank-side degradation, detect canister-side degradation and blockages, regulate fuel tank pressure during engine operation (e.g., when the engine is on), and depressurize the fuel tank for a refueling event, such as according to the example methods of FIGS. 3-8.

Turning first to FIG. 3, a high-level flowchart of an example method 300 for diagnosing components of the evaporative emissions system and fuel system based on the output of the dP sensor is provided. As will be described below and further elaborated with respect to FIGS. 4-7, different components of the fuel system and the evaporative emissions system may be diagnosed depending on whether the engine is on or off. Thus, the methods of FIGS. 3-7 will be described together, though it should be understood that the methods of FIGS. 3-7 may also be performed independently of one another. Instructions for carrying out method 300 and the rest of the methods included herein may be executed by a controller (e.g., controller 12 of FIG. 2) based on instructions stored on a memory of the controller and in conjunction with signals received from sensors of the engine, such as the sensors described above with reference to FIGS. 1-2 (e.g., dP sensor 221 of FIG. 2). The controller may employ actuators of the engine system (e.g., FTIV 236 and vacuum pump 238 of FIG. 2) to adjust engine operation according to the methods described below. For example, method 300 of FIG. 3 includes a "passive" diagnostic for the FTIV and the fuel tank-side of the FTIV, utilizing only the output of the dP sensor without additional adjustments to actuators of the fuel system and the evaporative emissions system. Thus, parts of method 300 may be performed whenever the engine is off and output from the dP sensor is received by the controller.

Method 300 begins at 302 and includes evaluating operating parameters. Operating parameters may include, for example, vehicle status, engine status, evaporative emissions system status, and fuel system status. The vehicle status may refer to whether the vehicle is on or off, which may be determined based on a position of an ignition switch, for example. The engine status may refer to whether the engine is on or off, and if the engine is on, the engine status may further refer to engine operating parameters, such as engine speed, engine load, etc. The engine may be off if the engine is at rest (e.g., the engine speed is zero) and combustion is not occurring within engine cylinders (e.g., no fuel is supplied to the engine cylinders). The evaporative emissions system status may refer to an operating mode of the evaporative emissions system (such as a fuel vapor storage mode, a refueling mode, and a canister purging mode, as described above with respect to FIG. 2) and/or a state of various actuators of the evaporative emissions system, such as a canister vent valve (e.g., CVV 214 of FIG. 2) and a canister purge valve (e.g., CPV 212 of FIG. 2). The fuel system status may refer to whether the fuel system is sealed, with the FTIV closed. Further, the differential pressure between the evaporative emissions system and the fuel system may be measured by the dP sensor. For example, with the CVV kept normally open, coupling the evaporative emissions system to the atmosphere, the pressure of the evaporative emissions system may be equal to atmospheric pressure. Therefore, the fuel tank pressure may be determined relative to the atmospheric pressure from the output of the dP sensor.

At 304, it is determined if the engine is off. For example, the engine may be off while the vehicle is on and operating in an electric mode, wherein the vehicle is propelled only with torque from an electric motor (e.g., motor 120 of FIG. 1). In another example, the engine may be off while the vehicle is off (e.g., the ignition switch of the vehicle is in an off position), but the controller may be operating in an awake mode, such as to perform diagnostic routines, transmit data, etc.

If the engine is not off, method 300 proceeds to 306 and includes checking the canister-side for blockages. Blockages (e.g., obstructions) in a purge path or in a vent path of the evaporative emissions system may degrade evaporative emissions system performance, such as when a purge event is requested. Therefore, while the engine is running, the purge path and the vent path may be evaluated for blockages to ensure that purge occurs optimally, as will be described with respect to FIGS. 6-7. Following 306, method 300 ends.

If instead the engine is off at 304, method 300 proceeds to 308 and includes maintaining the FTIV closed. Maintaining the FTIV closed prevents fuel vapors from flowing from the fuel tank to the evaporative emissions system, such as to the fuel vapor storage canister. Further, maintaining the FTIV closed isolates the fuel tank-side (also referred to as the tank-side herein) from the canister-side of the FTIV and seals the fuel tank. This may create a pressure difference between the sealed fuel tank and the canister-side, which is vented to atmosphere (e.g., through a vent line, such as vent 227 of FIG. 2, and the open canister vent valve).

At 310, it is determined if the dP sensor pressure measurement is greater than a first threshold or less than a second threshold, the thresholds being non-zero. As mentioned above, with the canister-side vented to the atmosphere, the dP sensor reading indicates the relative pressure of the fuel tank with respect to atmospheric pressure. Due to the volatility of fuel, the fuel tank pressure is not expected to equal atmospheric pressure. Furthermore, the pressure inside the fuel tank varies with temperature. For example, the fuel tank pressure may increase as the temperature increases and more fuel evaporates. As another example, the fuel tank pressure may decrease as the temperature decreases and the fuel vapors condense, creating a vacuum (e.g., negative pressure with respect to atmospheric pressure) inside the fuel tank. Thus, the tank-side pressure may fluctuate with diurnal temperature fluctuations. If the FTIV were open, fluidly coupling a first pressure port of the dP sensor and a second pressure port of the dP sensor, the dP sensor would indicate a differential pressure of zero (e.g., no pressure difference). Furthermore, if degradation were present on the tank-side of the FTIV such that the fuel tank was coupled to the atmosphere (e.g., the fuel tank is not fully sealed), the dP sensor would read a relative pressure at or near zero. Thus, the first threshold may correspond to a threshold amount of non-zero, positive pressure relative to atmospheric pressure above which no degradation is indicated on the tank-side of the FTIV or the FTIV itself (e.g., a positive pass threshold). Similarly, the second threshold may correspond to a threshold amount of non-zero, negative pressure (e.g., vacuum) relative to atmospheric pressure below which no degradation is indicated on the tank-side of the FTIV or the FTIV itself (e.g., a negative pass threshold). In one non-limiting example, the first threshold is a differential pressure of 3 in $H_2O$, and the second threshold is a differential pressure of $-3$ in $H_2O$ (e.g., 3 in $H_2O$ of vacuum on the tank-side relative to the canister-side).

If the differential pressure measurement output by the dP sensor is greater than the first threshold or less than the second threshold (e.g., the relative pressure of the tank-side to the canister-side is not between the first threshold and the second threshold), method 300 proceeds to 312 and includes indicating that tank-side degradation and FTIV degradation is not detected. With the differential pressure measurement output by the dP sensor indicating that the fuel tank pressure is not approximately equal to the canister-side pressure (e.g., atmospheric pressure), it may be assumed that the fuel tank is sufficiently sealed from both the evaporative emissions system and the atmosphere. Indicating that tank-side degradation and FTIV degradation is not detected may further include storing the indication at the controller (e.g., in a memory of the controller).

At 314, method 300 includes performing a canister-side engine-off diagnostic, as will be described with reference to FIG. 5. With degradation of the tank-side and the FTIV ruled out, the canister-side of the FTIV may be conclusively diagnosed. For example, if the FTIV had been degraded and stuck open, the dP sensor may measure a differential pressure that is substantially equal to zero, which may cause degradation of the canister-side of the FTIV to be incorrectly indicated. Following 314, method 300 ends.

If instead the differential pressure reading output by the dP sensor is not greater than the first threshold or less than the second threshold (e.g., the pressure difference between the tank-side and the canister-side is between the first threshold and the second threshold) at 310, method 300 proceeds to 316 and includes determining if tank-side degradation or FTIV degradation is present, as will be described below with respect to FIG. 4. Following 316, method 300 ends.

Figure 4:
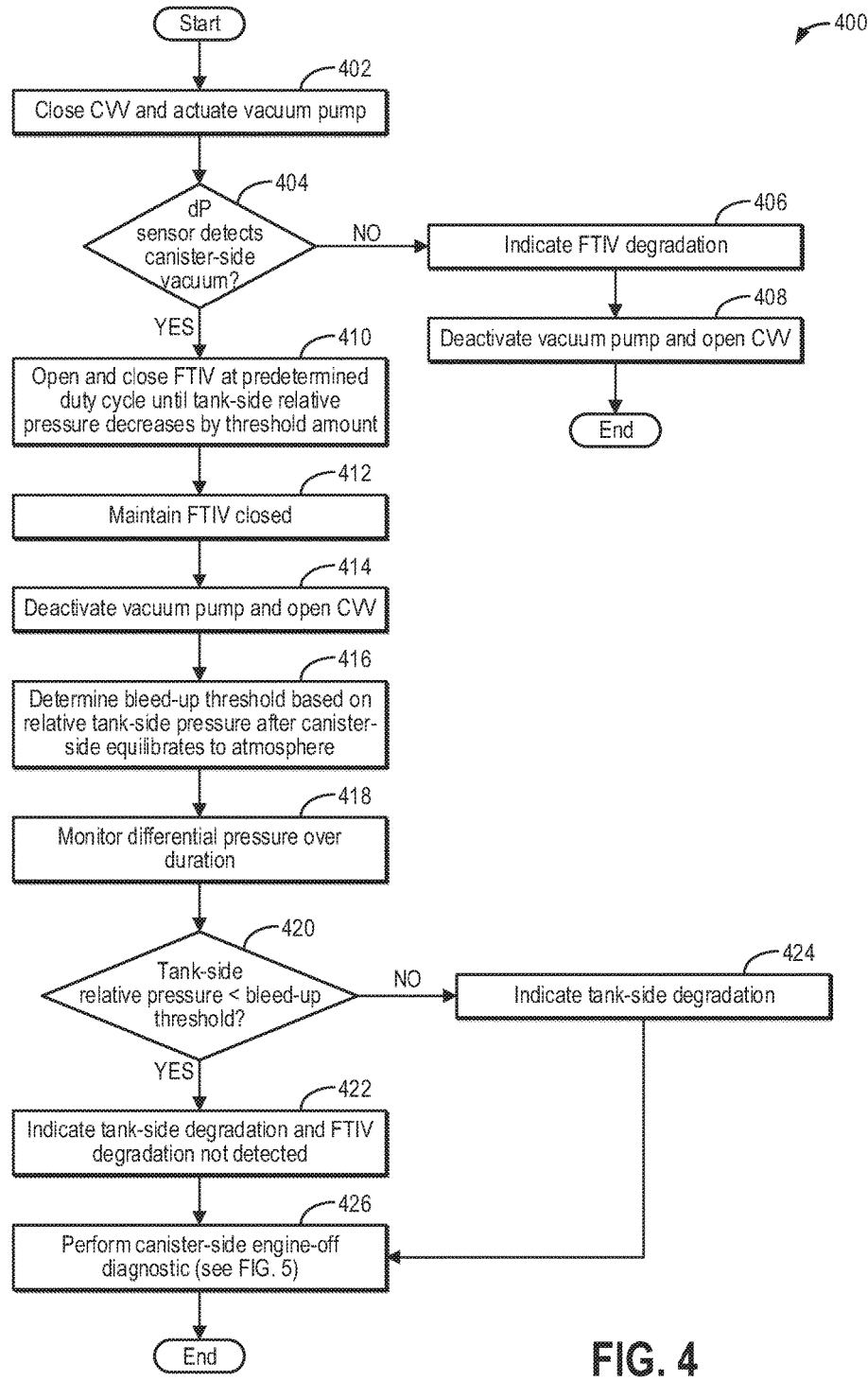
FIG. 4 shows an example method for determining if degradation of a FTIV or a fuel tank-side of the FTIV is present based on delta pressure sensor measurements.

Continuing to FIG. 4, an example method 400 for detecting degradation of the fuel tank-side of the FTIV and the FTIV itself and differentiating between the two is shown. Method 400 may be performed while the engine is off as a part of method 300 of FIG. 3 (e.g., at 316), for example. Whereas method 300 of FIG. 3 includes a "passive" check of the fuel system and the FTIV, method 400 includes actively altering fuel system and evaporative emissions system pressures, as described below.

Method 400 begins at 402 and includes closing the CVV of the evaporative emissions system and actuating a vacuum pump of the evaporative emissions system (e.g., vacuum pump 238 of FIG. 2). By actuating closed the CVV (and maintaining a canister purge valve of the evaporative emissions system as well as the FTIV closed), the canister-side of the FTIV may be sealed. The vacuum pump may evacuate the evaporative emissions system to a predetermined amount of vacuum, for example.

At 404, it is determined if the dP sensor detects canister-side vacuum. With the FTIV closed, a pressure of the canister-side may decrease while a pressure of the tank-side may remain constant, resulting in an increased differential pressure measured by the dP sensor. Specifically, the dP sensor measurement may indicate canister-side vacuum relative to the tank-side. Therefore, detecting canister-side vacuum may refer to a differential pressure measured by the dP sensor being greater than or equal to a threshold, with the threshold corresponding to a non-zero differential pressure that indicates the canister-side is under vacuum relative to the fuel tank-side. In some examples, the threshold may be set based on the predetermined amount of vacuum applied by the vacuum pump, with the threshold increasing as the predetermined amount of vacuum increases. For example, the controller may input the predetermined amount of vacuum applied by the vacuum pump into a look-up table or equation and output the corresponding threshold. In other examples, the threshold may be a constant predetermined value that is independent of the amount of vacuum applied by the vacuum pump.

If the FTIV is degraded, such as when the FTIV is stuck open (e.g., stuck and not fully closed), the differential pressure measured by the dP sensor may be at or near zero. Therefore, if the dP sensor does not detect canister-side vacuum (e.g., the differential pressure measured by the dP sensor is less than the threshold), method 400 proceeds to 406 and includes indicating FTIV degradation. For example, with the FTIV degraded and stuck at least partially open, the pressure at the first pressure port (coupled to the tank-side of the FTIV) and the pressure at the second pressure port (coupled to the canister-side of the FTIV) of the dP sensor may be the same, resulting in a differential pressure of zero. Indicating FTIV degradation may include setting a diagnostic trouble code (DTC) at the controller and may further include illuminating a malfunction indicator lamp (MIL) to alert a vehicle operator to service the vehicle. Further, fuel vapor storage canister purging may be adjusted in response to the indication of FTIV degradation. For example, vacuum drawn on the fuel vapor storage canister during purging may be communicated to the fuel tank through the degraded and at least partially open FTIV, resulting in additional fuel vapors being drawn through the open FTIV, to the fuel vapor storage canister, and ultimately, to the engine intake. With two sources of fuel vapors (e.g., desorbed fuel vapors from the fuel vapor storage canister and fuel vapors from the fuel tank) being purged, a purge flow rate may be decreased in order to prevent engine stalling. For example, the CPV may be adjusted to an open position that is further closed than when FTIV degradation is not indicated to decrease the purge flow rate.

At 408, method 400 includes deactivating the vacuum pump and opening the CVV. In this way, the evaporative emissions system may be re-equilibrated to atmospheric pressure. By returning the evaporative emissions system and the fuel system (through the degraded FTIV) to atmospheric pressure, less fuel may evaporate than if the evaporative emissions system and the fuel system were kept under vacuum. Following 408, method 400 ends.

However, if the dP sensor does detect canister-side vacuum at 404 (e.g., the differential pressure is greater than or equal to the threshold), indicating that the canister-side and the tank-side are isolated from each other by a fully closed FTIV, method 400 proceeds to 410 and includes opening and closing the FTIV at a predetermined duty cycle until the tank-side relative pressure decreases by a threshold amount. Each time the FTIV is opened, the evaporative emissions system will draw vacuum on the fuel system, resulting in a decreased differential pressure after every opening of the FTIV (e.g., the tank-side pressure becomes more similar to the canister-side pressure). Furthermore, each time the FTIV is opened, the dP sensor will read a differential pressure at or near zero, as the pressure at the first pressure port of the dP sensor may be approximately equal to the pressure at the second pressure port of the dP sensor with the FTIV open. Therefore, the differential pressure may be evaluated while the FTIV is closed. The threshold amount may be a non-zero amount of differential pressure and may be determined based on a starting differential pressure before the FTIV is duty cycled open and closed. For example, the controller may input the starting differential pressure into a look-up table or equation and output the threshold amount.

Once the tank-side relative pressure decreases by the threshold amount, at 412, method 400 includes maintaining the FTIV closed in order to isolate the tank-side of the FTIV from the canister-side of the FTIV. At 414, method 400 includes deactivating the vacuum pump and opening the CVV. In this way, the canister-side may be re-equilibrated to atmospheric pressure, while the tank-side will remain under vacuum. By coupling the canister-side of the FTIV to the atmosphere, any degradation of the canister-side that may prevent the canister-side from holding vacuum will not affect dP sensor readings.

At 416, method 400 includes determining a bleed-up threshold based on the relative tank-side pressure after the canister-side equilibrates to the atmosphere. With the tank-side under vacuum and the canister-side at atmospheric pressure, the pressure at the first pressure port (coupled to the tank-side of the FTIV) of the dP sensor is less than the pressure at the second pressure port (coupled to the canister-side of the FTIV). The canister-side may be determined to be equilibrated to atmospheric pressure when the dP sensor reading remains substantially constant (e.g., a rate of differential pressure increase or decrease is approximately zero). The bleed-up threshold may refer to an increase in tank-side pressure (e.g., a decrease in vacuum) that may occur over a duration at or above which it may be inferred that the fuel tank-side of the FTIV is not holding vacuum, such as if air from the atmosphere is being introduced into the fuel tank through an orifice or disconnection. Therefore, the bleed-up threshold may be set for a predetermined amount of increased tank-side pressure from a starting differential pressure (corresponding to the differential pressure after the canister-side equilibrates to the atmosphere). Alternatively, a threshold rate of pressure bleed-up may be determined, which may be a non-zero rate that corresponds to a rate of tank-side pressure increase (e.g., vacuum loss) for a fuel tank-side of the FTIV that is not completely sealed.

At 418, method 400 includes monitoring the differential pressure over the duration. The duration may be a predetermined duration, such as 30 seconds. With the canister-side coupled to the atmosphere, the canister-side pressure is not expected to appreciably change. Therefore, changes in the differential pressure measured by the dP sensor may be attributed to changes in the tank-side pressure, and the tank-side pressure relative to atmospheric pressure may be inferred from the differential pressure measurement. In an explanatory example, if the differential pressure measured by the dP sensor is −10 in $H_2O$, then in may be inferred that the tank-side pressure is −10 in $H_2O$ relative to atmospheric pressure.

At 420, it is determined if the tank-side relative pressure is less than the bleed-up threshold after the duration has elapsed. If the tank-side relative pressure remains less than the bleed-up threshold (or if the rate of pressure bleed-up is less than the threshold rate), method 400 proceeds to 422 and includes indicating that tank-side degradation and FTIV degradation is not detected. Further, the results of the test may be stored at the controller, such as on a memory of the controller.

At 426, method 400 includes performing a canister-side engine-off diagnostic, as will be described with respect to FIG. 5. With the FTIV determined to be functioning nominally (e.g., not degraded), dP sensor readings may be used to detect canister-side degradation without potential FTIV degradation confounding their interpretation. Following 426, method 400 ends.

If instead the relative tank-side pressure is greater than or equal to the bleed-up threshold (or the rate of pressure bleed-up is greater than or equal to the threshold rate) at 420, method 400 proceeds to 424 and includes indicating tank-side degradation. As mentioned above, with the tank-side relative pressure reaching the bleed-up threshold over the duration, it may be inferred that the fuel tank-side of the FTIV is not entirely sealed, with air from the atmosphere entering the tank-side through an orifice, for example, to increase the tank-side pressure. Indicating tank-side degradation may include setting a corresponding DTC at the controller and may further include illuminating a MIL to alter the vehicle operator to service the vehicle. The method may then proceed to 426, as the canister-side may still be checked for degradation even if the tank-side is degradation as long as degradation of the FTIV is not indicated. Further, the FTIV may be kept open during a diurnal cycle in response to the indication of tank-side degradation. For example, increased fuel tank temperatures due to diurnal temperatures and sun loading may increase fuel evaporation, thereby increasing the fuel tank pressure. With tank-side degradation present, the increased pressure may lead to fuel vapors escaping to the atmosphere to relieve the pressure. By keeping the FTIV open, less pressure may build in the fuel tank and at least a portion of the fuel vapors will be routed to the fuel vapor storage canister instead of to the atmosphere, reducing vehicle emissions.

Figure 5:
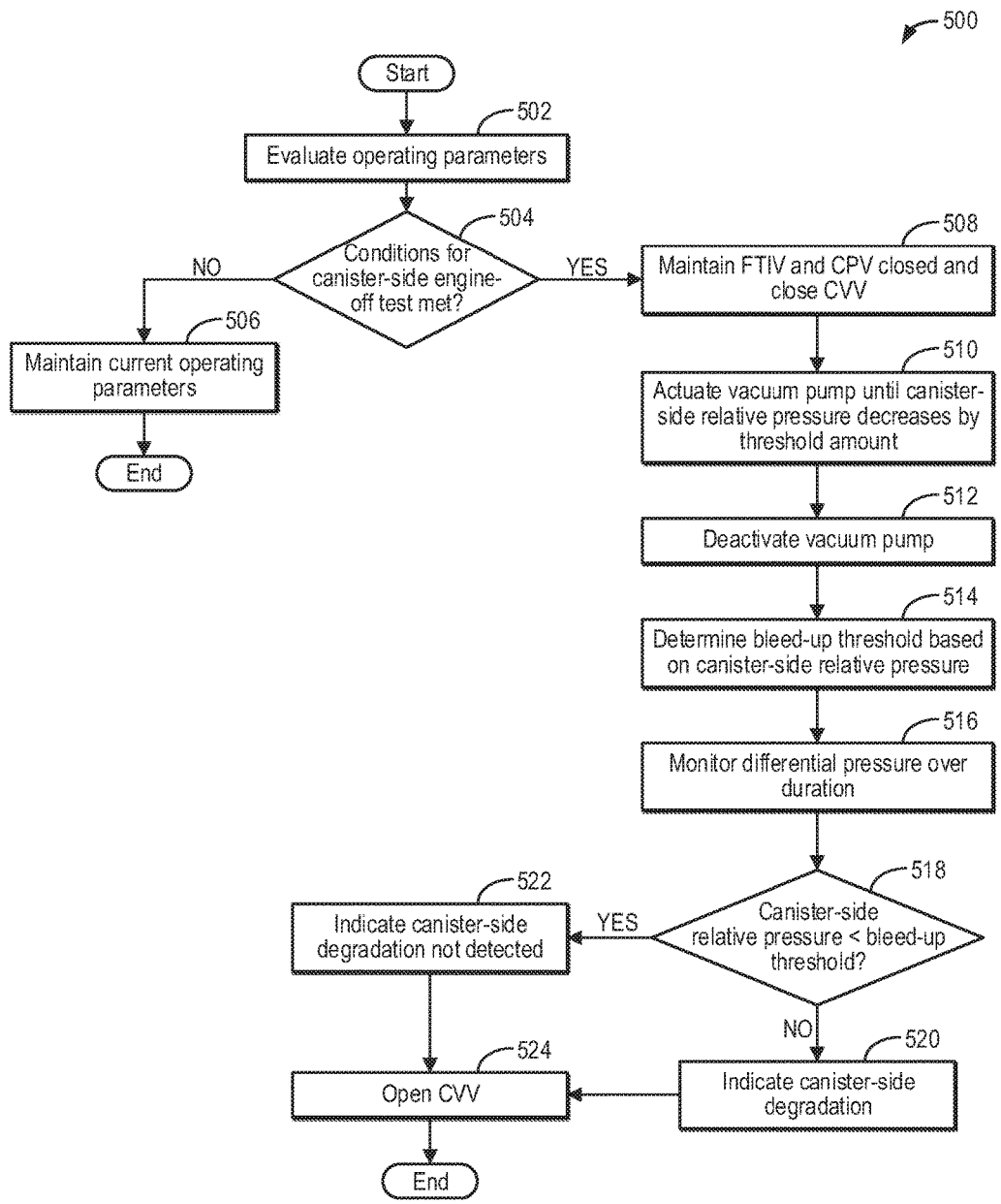
FIG. 5 depicts an example method for conducting a fuel vapor storage canister-side diagnostic test using delta pressure sensor measurements.

Turning next to FIG. 5, an example method 500 is shown for a canister-side engine-off diagnostic test. Since degradation of the fuel vapor storage canister-side of the FTIV may lead to undesired evaporative emissions, checking the canister-side for degradation may help ensure that the vehicle emissions remain within emissions requirements. In some examples method 500 may be performed as a part of method 300 of FIG. 3 (e.g., at 314) or as a part of method 400 of FIG. 4 (e.g., at 426). However, in other examples, method 500 of FIG. 5 may be performed whenever conditions for the canister-side engine-off diagnostic test are met, as will be described below.

Method 500 begins at 502 and includes evaluating operating parameters. Operating parameters may include, for example, vehicle status, engine status, evaporative emissions system status, and fuel system status. The vehicle status may refer to whether the vehicle is on or off, which may be determined based on a position of an ignition switch, for example. The engine status may refer to whether the engine is on (e.g., the engine has a non-zero speed and combustion is occurring in engine cylinders) or off (e.g., the engine speed is zero and combustion is not occurring within engine cylinders). The evaporative emissions system status may refer to an operating mode of the evaporative emissions system (such as a fuel vapor storage mode, a refueling mode, and a canister purging mode, as described above with respect to FIG. 2), a state of various actuators of the evaporative emissions system, and/or whether any degradation is indicated in the evaporative emissions system. The fuel system status may refer to whether the fuel system is sealed, with the FTIV closed, and/or whether any degradation is indicated in the fuel system. Further, the differential pressure between the evaporative emissions system and the fuel system may be measured by the dP sensor.

At 504, it is determined if conditions for the canister-side engine-off diagnostic test are met. Entry conditions for the canister-side engine-off diagnostic test may include the engine being off and no indication of FTIV degradation. The conditions may further include no other canister-side degradation being indicated, such as electrical shorts, vacuum pump degradation, and/or degradation of the CVV (such as the CVV being stuck open). In some examples, the conditions may further include the FTIV having been recently evaluated (e.g., within a first predetermined duration), such as according to the example methods of FIG. 3 and/or FIG. 4, and a second predetermined duration since the previous canister-side engine-off diagnostic test having elapsed.

If conditions for the canister-side engine-off diagnostic test are not met, method 500 proceeds to 506 and includes maintaining the current operating parameters. Maintaining the current operating parameters may include not altering the control of the evaporative emissions system actuators, such as the CVV, the CPV, and the vacuum pump. For example, if the CVV is currently open, it will not be commanded closed and will remain open. Following 506, method 500 ends.

If conditions for the canister-side engine-off diagnostic test are met, method 500 proceeds to 508 and includes maintaining the FTIV and the CPV closed and closing the CVV. For example, the FTIV will not be actuated open. With the FTIV closed, the dP sensor output corresponds to a difference in pressure between the fuel vapor storage canister-side of the FTIV and the fuel tank-side of the FTIV. Furthermore, the CPV will not be actuated open, isolating the evaporative emissions system from an intake manifold of the engine. Further still, with the CVV commanded closed, the evaporative emissions will be sealed from the atmosphere. Thus, the evaporative emissions system will be sealed from the fuel system, the engine, and the atmosphere.

At 510, method 500 includes actuating the vacuum pump until a relative pressure of the canister-side decreases by a threshold amount. For example, the pressure at the first pressure port of the dP sensor, coupled to the fuel system, may be higher than the pressure at the second pressure port of the dP sensor, coupled to the evaporative emissions system. As the vacuum pump evacuates the evaporative emissions system, the difference in pressure between the first pressure port and the second pressure port may increase. Thus, the threshold amount may correspond to a predetermined vacuum target (e.g., −10 in $H_2O$) to apply to the canister-side from a starting differential pressure. In one explanatory example, if the starting relative pressure is 5 in $H_2O$ (e.g., the pressure of the tank-side is 5 in $H_2O$ higher than the pressure of the canister-side) and the predetermined vacuum target is −10 in $H_2O$, the vacuum pump may be actuated until the dP sensor reads a relative pressure of 15 in $H_2O$, meaning that the canister-side pressure has decreased by 10 in $H_2O$ relative to the tank-side pressure.

At 512, method 500 includes deactivating the vacuum pump. With the target amount of vacuum achieved in the canister-side, the vacuum pump may be deactivated in order to maintain the canister-side at the target vacuum.

At 514, method 500 includes determining a bleed-up threshold based on the canister-side relative pressure. The bleed-up threshold may refer to an increase in canister-side relative pressure (e.g., decrease in relative vacuum) that may occur over a duration at or above which it may be inferred that the fuel vapor storage canister-side of the FTIV is not holding vacuum, such as if air from the atmosphere is being introduced into the evaporative emissions through an orifice or disconnection. Therefore, the bleed-up threshold may be set for predetermined amount of increased canister-side relative pressure from a starting differential pressure (e.g., the differential pressure when the vacuum pump is deactivated). Alternatively, a threshold rate of pressure bleed-up may be determined, which may be a non-zero rate that corresponds to a rate of canister-side pressure increase (e.g., vacuum loss) indicating that the canister-side of the FTIV is not completely sealed. Expanding on the explanatory example above, if the dP sensor reads a differential pressure of 15 in $H_2O$ when the vacuum pump is deactivated, the canister-side pressure is 15 in $H_2O$ less than the tank-side pressure for a canister-side relative pressure of −15 in $H_2O$. The bleed-up threshold may be set as a differential pressure of 13 in $H_2O$, corresponding to a canister-side relative pressure of −13 in $H_2O$, meaning that the canister-side relative pressure may increase by less than 2 in $H_2O$ to remain below the threshold.

At 516, method 500 includes monitoring the differential pressure over the duration. The duration may be a predetermined duration, such as 30 seconds. Although the tank-side pressure may fluctuate, such as due to diurnal temperatures, the tank-side pressure is not expected to appreciably change within the duration. Therefore, changes in the differential pressure measured by the dP sensor may be attributed to changes in the canister-side pressure.

At 518, it is determined if the canister-side relative pressure is less than the bleed-up threshold. If the canister-side relative pressure is not less than the bleed-up threshold (or if a rate of pressure bleed-up is not less than the threshold rate), method 500 proceeds to 520 and includes indicating canister-side degradation. For example, the canister-side may not be sealed, with air entering from the atmosphere through an orifice, a stuck open valve (e.g., the CVV or the CPV), or a disconnection. Indicating canister-side degradation may include setting a corresponding DTC at the controller and may further include illuminating a MIL to alert the vehicle operator to service the vehicle. Further, in some examples, canister purging may be disabled. For example, if the fuel vapor storage canister were purged while an orifice is present in the evaporative emissions system, unmetered air may enter through the orifice, causing the engine to run lean. Therefore, purge may be disabled until the vehicle is serviced and the DTC is cleared. Further still, tank-side diagnostic tests (such as according to method 400 of FIG. 4) may not be performed while canister-side degradation is indicated. For example, the canister-side degradation may confound the tank-side diagnostic test.

If, at 518, the canister-side relative pressure is less than the bleed-up threshold after the duration (or if the rate of pressure bleed-up is less than the threshold rate), method 500 proceeds to 522 and includes indicating that canister-side degradation is not detected. Further, the results of the test may be stored at the controller, such as on a memory of the controller. The controller may then schedule a subsequent canister-side engine-off diagnostic and/or update a purge schedule, for example.

At 524, method 500 includes opening the CVV. With the canister-side engine-off diagnostic test complete, the CVV may be opened to couple the evaporative emissions system to atmosphere. With the evaporative emissions system coupled to atmosphere, the dP sensor reading may correspond to a pressure of the fuel tank relative to the atmosphere, which may facilitate fuel tank pressure control, as will be described with respect to FIG. 8. Following 524, method 500 ends.

The canister-side engine-off diagnostic test described above may be used to detect degradation that prevents the evaporative emissions system from being completely sealed, such as due to an orifice, disconnection, stuck open valve, etc. However, the canister-side engine-off diagnostic test does not detect blockages that may be present in the evaporative emissions system that may degrade fuel vapor storage canister purging operations. In one example, if an obstruction is present in a purge line that couples the fuel vapor storage canister to the engine intake (e.g., purge line 228 of FIG. 2), then fuel vapors may not be purged to the engine intake (or, if the flow is restricted, a purge flow rate may be reduced). In another example, if an obstruction is present in a vent that couples the fuel vapor storage canister to the atmosphere, then fresh air may not be drawn across the fuel vapor storage canister during purging, which may result in incomplete fuel vapor storage canister cleaning.

Figure 6:
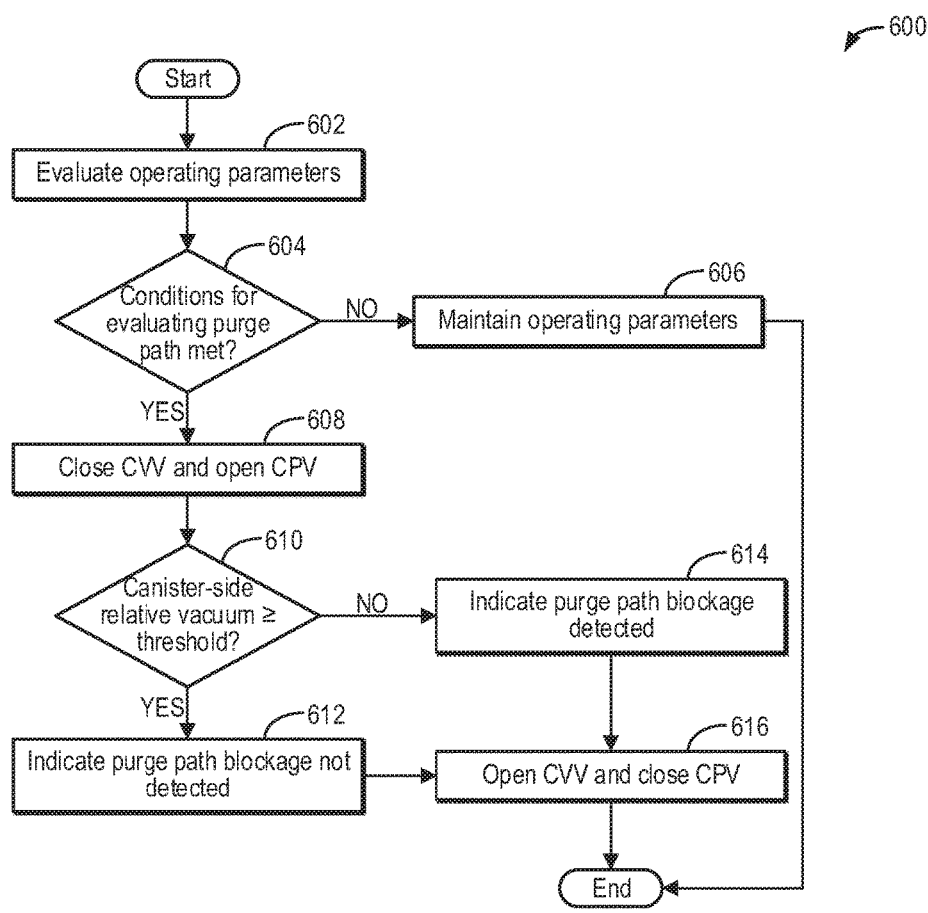
FIG. 6 shows an example method for evaluating a purge path of an evaporative emissions system using output from a delta pressure sensor.

Turning next to FIG. 6, an example method 600 is provided for detecting blockages in a purge path of the evaporative emissions system. The purge path may include the purge line as well as the CPV, for example. Method 600 of FIG. 6 may be performed when the engine is on, utilizing vacuum from the intake manifold, as will be described below. For example, method 600 may be performed as a part of method 300 of FIG. 3 (e.g., at 306) in response to the engine being on. However, in other examples, method 600 of FIG. 6 may be performed whenever conditions for the evaluating the purge path are met, as will be described below.

Method 600 begins at 602 and includes evaluating operating parameters. Operating parameters may include, for example, vehicle status, engine status, evaporative emissions system status, and fuel system status. The vehicle status may refer to whether the vehicle is on or off, which may be determined based on a position of an ignition switch, for example. The engine status may refer to whether the engine is on (e.g., the engine has a non-zero speed and combustion is occurring in engine cylinders) or off (e.g., the engine speed is zero and combustion is not occurring within engine cylinders), and if the engine is on, the engine status may further refer to engine operating parameters, such as engine speed, engine load, manifold absolute pressure (MAP), etc. The evaporative emissions system status may refer to an operating mode of the evaporative emissions system (such as a fuel vapor storage mode, a refueling mode, and a canister purging mode, as described above with respect to FIG. 2), a state of various actuators of the evaporative emissions system, and/or whether any degradation is indicated in the evaporative emissions system. The fuel system status may refer to whether the fuel system is sealed, with the FTIV closed, and/or whether any degradation is indicated in the fuel system. Further, the differential pressure between the evaporative emissions system and the fuel system may be measured by the dP sensor.

At 604, it is determined if conditions for evaluating the purge path are met. Conditions for evaluating the purge path may include, for example, the engine being on and no indication of FTIV degradation. The conditions may further include no canister-side degradation being indicated, such as the degradation described above with respect to FIG. 5, electrical shorts, vacuum pump degradation, degradation of the CVV (such as the CVV being stuck open), and/or degradation of the CPV (such as the CPV being stuck closed). The conditions for evaluating the purge path may also include MAP being less than a threshold pressure, the threshold pressure referring to a sufficient amount of vacuum in the intake manifold for evaluating the purge path.

If the conditions for evaluating the purge path are not met, method 600 proceeds to 606 and includes maintaining operating parameters. Maintaining the operating parameters may include not altering the control of the evaporative emissions system actuators, such as the CVV and the CPV. For example, if the CVV is currently open, it will not be commanded closed and will remain open. Following 606, method 600 ends.

If the conditions for evaluating the purge path are met, method 600 proceeds to 608 and includes closing the CVV and opening the CPV. With the CPV opened, the intake manifold may draw vacuum on the evaporative emissions system. Further, with the CVV closed, air may not be drawn across the fuel vapor storage canister, which may reduce an amount of fuel vapors desorbed from adsorbent within the fuel vapor storage canister and purged to the intake manifold.

At 610, it is determined if the canister-side relative vacuum is greater than or equal to a threshold. The canister-side relative vacuum may be determined from the dP sensor measurement. For example, the pressure at the first pressure port of the dP sensor, coupled to the fuel system, may be higher than the pressure at the second pressure port of the dP sensor, coupled to the evaporative emissions system. As the intake manifold draws vacuum on the evaporative emissions system, the difference in pressure between the first pressure port and the second pressure port may increase. Although the tank-side pressure may fluctuate, such as due to diurnal temperatures, the tank-side pressure is not expected to appreciably change during the purge path evaluation. Therefore, changes in the differential pressure measured by the dP sensor may be attributed to changes in the canister-side pressure. As an explanatory example, if the dP sensor measures a differential pressure of 10 in $H_2O$, indicating that the tank-side pressure is 10 in $H_2O$ higher than the canister-side pressure, then the canister-side relative vacuum (e.g., negative pressure) is 10 in $H_2O$. The threshold may be a non-zero pressure value that may be determined based on a starting differential pressure (e.g., the differential pressure value just prior to closing the CVV and opening the CPV at 608) and a minimum amount of vacuum that the canister-side would achieve if no purge path blockages were present. Therefore, the threshold may be further determined based on MAP. For example, the controller may input the starting differential pressure and the MAP into a look-up table or equation and output the threshold. Determining if the canister-side relative vacuum is greater than or equal to the threshold may further include determining if the canister-side relative vacuum reaches or surpasses the threshold within a predetermined duration.

If the canister-side relative vacuum is greater than or equal to the threshold (e.g., the canister-side relative pressure is less than, method 600 proceeds to 612 and includes indicating that a purge path blockage is not detected. For example, with the purge path free of blockages, such as no obstructions being present in the purge line and the CPV being fully open, vacuum drawn by the intake manifold has successfully evacuated the evaporative emissions system to at least the threshold amount of vacuum within the predetermined duration. Indicating that a purge path blockage is not detected may include storing the result on a memory of the controller, for example.

If the canister-side relative vacuum is not greater than or equal to the threshold (e.g., the canister-side pressure is greater than the threshold), method 600 proceeds to 614 and includes indicating a purge path blockage is detected. A purge path blockage, such as a degraded CPV not fully opening or an obstruction in the purge line, may prevent the intake manifold from drawing vacuum on the evaporative emissions system or may reduce the rate at which the evaporative emissions system is evacuated, for example. Indicating a purge path blockage may include setting a corresponding DTC at the controller and may further include illuminating a MIL to alter the vehicle operator to service the vehicle. Further, canister purging may be disabled until the vehicle is serviced and the DTC is cleared.

At 616, method 600 includes opening the CVV and closing the CPV. By opening the CVV, the evaporative emissions system may be coupled to the atmosphere. Further, by closing the CPV, the evaporative emissions system may be isolated from the intake manifold. Thus, the evaporative emissions system may re-equilibrate to atmospheric pressure. Following 616, method 600 ends.

Figure 7:
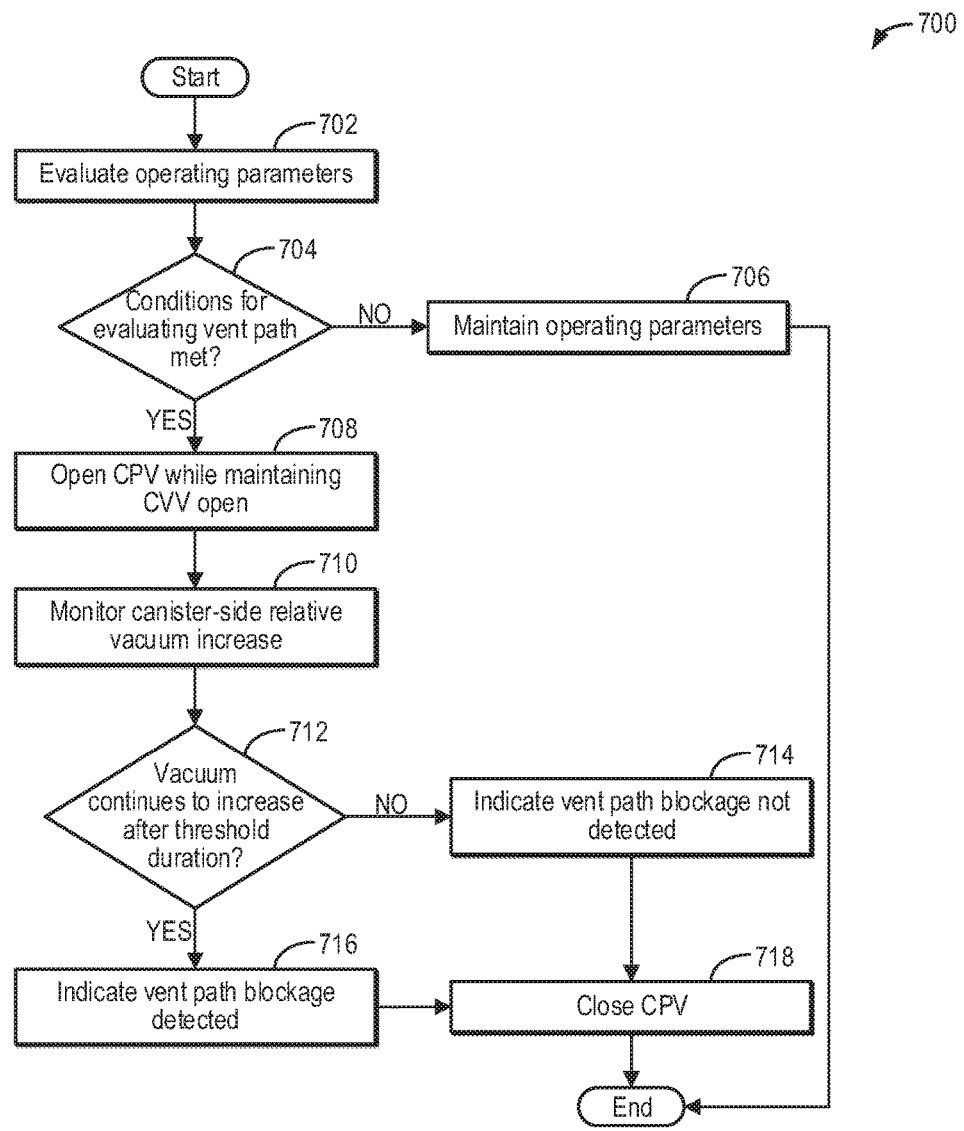
FIG. 7 shows an example method for evaluating a vent path of an evaporative emissions system using output from a delta pressure sensor.

Continuing to FIG. 7, an example method 700 is provided for detecting blockages in a vent path of the evaporative emissions system. The vent path may include the vent as well as the CVV, for example, and an air filter, if included. Similar to method 600 of FIG. 6, method 700 of FIG. 7 may be performed when the engine is on, utilizing vacuum from the intake manifold. For example, method 700 may be performed as a part of method 300 of FIG. 3 (e.g., at 306) in response to the engine being on. However, in other examples, method 700 of FIG. 7 may be performed whenever conditions for the evaluating the vent path are met, as will be described below.

Method 700 begins at 702 and includes evaluating operating parameters. Operating parameters may include, for example, vehicle status, engine status, evaporative emissions system status, and fuel system status. The vehicle status may refer to whether the vehicle is on or off, which may be determined based on a position of an ignition switch, for example. The engine status may refer to whether the engine is on (e.g., the engine has a non-zero speed and combustion is occurring in engine cylinders) or off (e.g., the engine speed is zero and combustion is not occurring within engine cylinders), and if the engine is on, the engine status may further refer to engine operating parameters, such as engine speed, engine load, MAP, etc. The evaporative emissions system status may refer to an operating mode of the evaporative emissions system (such as a fuel vapor storage mode, a refueling mode, and a canister purging mode, as described above with respect to FIG. 2), a state of various actuators of the evaporative emissions system, and/or whether any degradation is indicated in the evaporative emissions system. The fuel system status may refer to whether the fuel system is sealed, with the FTIV closed, and/or whether any degradation is indicated in the fuel system. Further, the differential pressure between the evaporative emissions system and the fuel system may be measured by the dP sensor.

At 704, it is determined if conditions for evaluating the vent path are met. Conditions for evaluating the vent path may include, for example, the engine being on and no indication of FTIV degradation. The conditions may further include no canister-side degradation being indicated, such as the degradation described above with respect to FIG. 5, electrical shorts, vacuum pump degradation, degradation of the CVV (such as the CVV being stuck open), degradation of the CPV (such as the CPV being stuck closed), and/or purge path blockages. The conditions for evaluating the vent path may also include MAP being less than a threshold pressure, the threshold pressure referring to a sufficient amount of vacuum in the intake manifold for evaluating the vent path.

If the conditions for evaluating the vent path are not met, method 700 proceeds to 706 and includes maintaining operating parameters. Maintaining the operating parameters may include not altering the control of the evaporative emissions system actuators, such as the CVV and the CPV. For example, if the CPV is currently closed, it will not be commanded open and will remain closed. Following 706, method 700 ends.

If the conditions for evaluating the vent path are met, method 700 proceeds to 708 and includes opening the CPV while maintaining the CVV open. With the CPV opened, the intake manifold may draw vacuum on the evaporative emissions system. Further, with the CVV open, fresh air may be drawn in through the vent and across the fuel vapor storage canister, resulting in a smaller amount of canister-side vacuum generated compared to an amount of canister-side vacuum that may be generated with the CVV closed. Therefore, a finite amount of vacuum may build in the evaporative emissions system, which may be less than the amount of vacuum in the intake manifold, before the evaporative emissions system reaches a pressure equilibrium and the amount of vacuum remains substantially constant. However, if the vent path is blocked, fresh air may not be drawn into the evaporative emissions system and the vacuum may continue to build, as will be described below.

At 710, method 700 includes monitoring the canister-side relative vacuum increase. The canister-side relative vacuum may be determined from the dP sensor measurement. For example, the pressure at the first pressure port of the dP sensor, coupled to the fuel system, may be higher than the pressure at the second pressure port of the dP sensor, coupled to the evaporative emissions system. With the FTIV closed, as the intake manifold draws vacuum on the evaporative emissions system, the difference in pressure between the first pressure port and the second pressure port may increase. Although the tank-side pressure may fluctuate, such as due to diurnal temperatures, the tank-side pressure is not expected to appreciably change during the vent path evaluation. Therefore, changes in the differential pressure measured by the dP sensor may be attributed to changes in the canister-side pressure. As an explanatory example, if the dP sensor measures a differential pressure of 10 in $H_2O$, indicating that the tank-side pressure is 10 in $H_2O$ higher than the canister-side pressure, then the canister-side relative vacuum (e.g., negative pressure) is 10 in $H_2O$. If the subsequent dP sensor output corresponds to a differential pressure of 12 in $H_2O$, then the canister-side relative vacuum has increased by 2 in $H_2O$. If instead the subsequent dP sensor output corresponds to a differential pressure of 10 in $H_2O$, then the canister-side relative vacuum has not increased or decreased (e.g., has remained stable). For example, monitoring the canister-side relative vacuum increase may include comparing a current canister-side relative vacuum measurement to an initial canister-side relative vacuum measurement, such as the canister-side relative vacuum just prior to opening the CPV (e.g., at 708).

At 712, method 700 includes determining if the canister-side relative vacuum continues to increase after a threshold duration. The threshold duration may be a non-zero time duration that refers to a maximum amount of time that it is expected to take the evaporative emissions system to reach the pressure equilibrium if the vent path is not blocked (e.g., no obstructions are present and the CVV is fully open).

If the canister-side relative vacuum does not continue to increase after the threshold duration has elapsed (e.g., the canister-side relative vacuum reaches a maximum by the threshold duration and remains substantially constant), method 700 proceeds to 714 and includes indicating that a vent path blockage is not detected. For example, with the vent path free of blockages, such as no obstructions being present in the vent and the CVV being fully open, vacuum drawn by the intake manifold may evacuate the evaporative emissions system to a finite, stable amount of vacuum during the threshold duration. Indicating that a vent path blockage is not detected may include storing the result on a memory of the controller, for example.

If the canister-side relative vacuum continues to increase after the threshold duration has elapsed, method 700 proceeds to 716 and includes indicating a vent path blockage is detected. For example, the CVV may be degraded and stuck at least partially closed, an obstruction may be present in the vent, or, if included, an air filter may be clogged, for example. Such a blockage may prevent the evaporative emissions system from reaching the pressure equilibrium, as the intake manifold may continue to evacuate the evaporative emissions system with no (or not enough) air flowing in through the vent to maintain the pressure. Indicating a vent path blockage may include setting a corresponding DTC at the controller and may further include illuminating a MIL to alter the vehicle operator to service the vehicle. Further, canister purging may be disabled until the vehicle is serviced and the DTC is cleared. Further still, the CPV may be opened during refueling to prevent premature shutoffs to a refueling nozzle. For example, during refueling, refueling vapors may generate pressure in the fuel tank, which may be vented to the evaporative emissions system through the open FTIV. However, with the vent path blocked, the evaporative emissions system may not be vented to the atmosphere, leading to a pressure increase in the evaporative emissions system and fuel system that may prematurely shut off the refueling nozzle. Therefore, by opening the CPV, the evaporative emissions system and fuel system may be vented to the engine. If an emission control device of the vehicle is warm (e.g., above its light-off temperature), the engine may be spun unfueled (e.g., using a starter motor or an electric motor) to direct refueling vapors toward the emission control device while refueling with the CPV open. If the emission control device is cold (e.g., a temperature of the emission control device is less than its light-off temperature), spark may be provided while the engine is spun in order to combust the refueling vapors. As an example, if the vehicle is an autonomous HEV and has a priori knowledge that a refueling event will be requested (e.g., within a duration), the controller may proactively start the engine in order to heat the emission control device to its light-off temperature prior to arriving at a refueling station.

At 718, method 718 includes closing the CPV. With the CPV closed, the evaporative emissions system will be isolated from the engine intake, and vacuum will no longer be drawn on the evaporative emissions system by the intake manifold. Following 718, method 700 ends.

Together, in one example, the methods of FIGS. 3-7 may include differentiating degradation between each of a sealed fuel tank, an evaporative emissions system, and a FTIV based on a differential pressure measured by a dP sensor coupled across the FTIV, the FTIV positioned between the sealed fuel tank and a fuel vapor storage canister of the evaporative emissions system. For example, while the engine is off and the FTIV is closed, in response to a differential pressure between a first, higher threshold and a second, lower threshold, the method may include differentiating degradation between the sealed fuel tank and the FTIV and not the evaporative emissions system. Differentiating degradation between the sealed fuel tank and the FTIV may include actuating a vacuum pump of the evaporative emissions system to evacuate the evaporative emissions system and indicating degradation of the FTIV and not degradation of the sealed fuel tank in response to the differential pressure remaining between the first, higher threshold and the second, lower threshold. The indicating degradation of the FTIV may include setting a corresponding DTC a controller, for example. In response to the differential pressure not remaining between the first, higher threshold and the second, lower threshold after the vacuum pump is actuated, vacuum may be applied to the sealed fuel tank by opening and closing the FTIV until a relative pressure of the sealed fuel tank, determined based on the differential pressure measured by the dP sensor while the FTIV is closed, decreases by a first threshold amount. The relative pressure of the sealed fuel tank is then monitored using the dP sensor, and in response to the relative pressure of the sealed fuel tank reaching or surpassing a third threshold within a first predetermined duration, indicating degradation of the sealed fuel tank and not degradation of the FTIV. The indicating degradation of the sealed fuel tank may include setting a corresponding DTC a controller, for example. Furthermore, differentiating degradation between each of a sealed fuel tank, an evaporative emissions system, and a FTIV may include closing a canister vent valve to seal the evaporative emissions system from atmosphere, actuating the vacuum pump until a relative pressure of the evaporative emissions system, determined based on the differential pressure measured by the dP sensor, decreases by a second threshold amount, and indicating degradation of the evaporative emissions system and not degradation of the FTIV or degradation of the sealed fuel tank in response to the relative pressure of the evaporative emissions system reaching or exceeding a fourth threshold within a second predetermined duration. The indicating degradation of the evaporative emissions system may include setting a corresponding DTC a controller, for example.

In another example, the methods of FIGS. 3-7 may include determining degradation of the FTIV and in response thereto, setting a first DTC and not determining degradation of a fuel tank-side of the FTIV or a fuel vapor storage canister-side of the FTIV; determining degradation of the fuel tank-side of the FTIV (which may not be degradation of the FTIV) and in response thereto, setting a second DTC; and determining degradation of the fuel vapor storage canister-side of the FTIV (which may not be degradation of the FTIV or degradation of the fuel tank-side of the FTIV) and in response thereto, setting a third DTC. In some examples, determining degradation of the fuel vapor storage canister-side of the FTIV may occur while or during degradation of the fuel tank-side of the FTIV is present. As illustrated by examples herein, the methods of operating and performing actions responsive to a determination of degradation may include operating with degradation of the FTIV, the fuel tank-side of the FTIV, and/or the fuel vapor storage-side of the FTIV present (e.g., operating with the vehicle traveling and optionally with the engine combusting fuel) as well as operating without degradation of the FTIV, the fuel tank-side of the FTIV, and/or the fuel vapor storage-side of the FTIV present.

In still another example, the methods of FIGS. 3-7 may include determining a presence or absence of a blockage in a purge path of the evaporative emissions system and determining a presence or absence of a blockage in a vent path of the evaporative emission system. In some examples, determining a presence or absence of a blockage in the purge path occurs while a blockage in the vent path is not present, and determining a presence or absence of a blockage in the vent path occurs while a blockage in the purge path is not present. Further, instructions stored in memory may include, while an engine is running, sending a signal to open a canister purge valve, sending a signal to close a canister vent valve, and determining a presence or absence of a blockage in the purge path from an output of the dP sensor. In another example, instructions stored on memory may include, what the engine is running, sending a signal to open the canister purge valve and determining a presence or absence of a blockage in the vent path from an output of the dP sensor.

Figure 8:
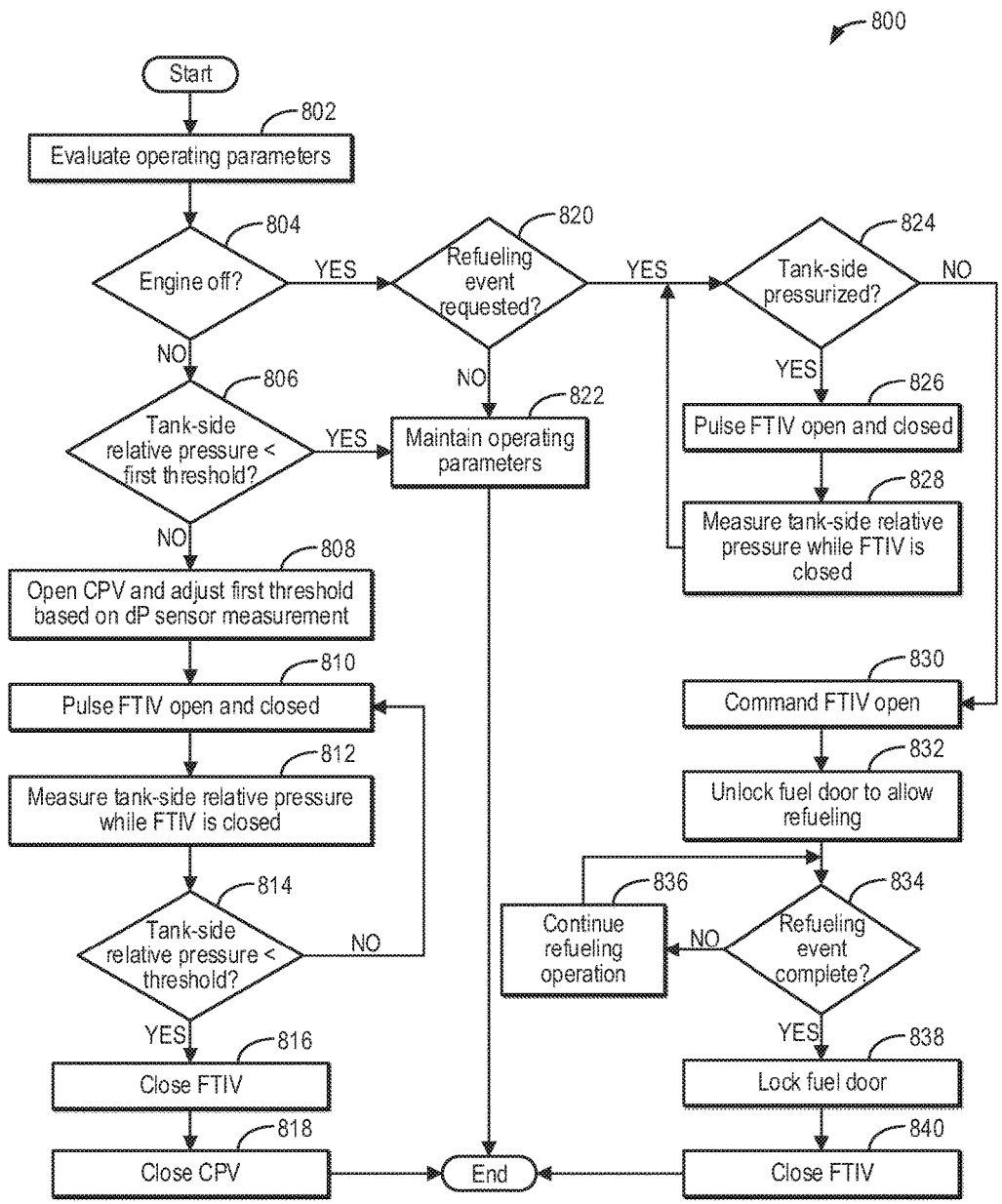
FIG. 8 shows an example method for regulating fuel tank pressure based on output from a delta pressure sensor during both engine operation and refueling events.

Next, FIG. 8 shows an example method 800 for regulating fuel tank pressure based on output of a single dP sensor (e.g., dP sensor 221 of FIG. 2) coupled across a FTIV (e.g., FTIV 236 of FIG. 2) that isolates a fuel system (e.g., a fuel tank-side of the FTIV) from an evaporative emissions system (e.g., a fuel vapor storage canister-side of the FTIV). The fuel tank (such as fuel tank 220 of FIG. 2) may be a sealed fuel tank of a NICROS, as part of a hybrid vehicle system, for example. As such, an engine of the vehicle may be rarely activated, with the vehicle more frequently propelled with torque from an electric motor (e.g., operated in an electric-only mode) and not with torque from the engine. Further, when a refueling event is requested, if the fuel tank is pressurized relative to atmospheric pressure, the fuel tank may be vented to the evaporative emissions system, with fuel vapors routed to a fuel vapor storage canister (e.g., fuel vapor storage canister 222 of FIG. 2), in order to prevent fuel mist from spraying out of the fuel system when a fuel door (e.g., fuel door 286 of FIG. 2) is opened.

Method 800 begins at 802 and includes evaluating operating parameters. Operating parameters may include, for example, vehicle status, engine status, evaporative emissions system status, and fuel system status. The vehicle status may refer to whether the vehicle is on or off, which may be determined based on a position of an ignition switch, for example. The engine status may refer to whether the engine is on or off, and if the engine is on, the engine status may further refer to engine operating parameters, such as engine speed, engine load, MAP, etc. The engine may be off if the engine is at rest (e.g., the engine speed is zero) and combustion is not occurring within engine cylinders (e.g., no fuel is supplied to the engine cylinders). The evaporative emissions system status may refer to an operating mode of the evaporative emissions system (such as a fuel vapor storage mode, a refueling mode, and a canister purging mode, as described above with respect to FIG. 2) and/or a state of various actuators of the evaporative emissions system, such as a canister vent valve (e.g., CVV 214 of FIG. 2) and a canister purge valve (e.g., CPV 212 of FIG. 2). The fuel system status may refer to whether the fuel system is sealed, with the FTIV closed, and a fuel level in the fuel tank, for example. Further, the differential pressure between the evaporative emissions system and the fuel system may be measured by the dP sensor. For example, with the CVV kept normally open, coupling the evaporative emissions system to the atmosphere, the pressure of the evaporative emissions system may be equal to atmospheric pressure. Therefore, the fuel tank pressure may be determined relative to the atmospheric pressure from the output of the dP sensor.

At 804, it is determined if the engine is off (for example, at rest without combustion occurring). For example, the engine may be off while the vehicle is on and operating in an electric mode, wherein the vehicle is propelled only with torque from an electric motor (e.g., motor 120 of FIG. 1). In another example, the engine may be off while the vehicle is off (e.g., the ignition switch of the vehicle is in an off position), but the controller may be operating in an awake mode, such as to perform diagnostic routines, transmit data, etc.

If the engine is not off (e.g., the engine is on, such as carrying out combustion, with a speed above zero), method 800 proceeds to 806 and includes determining if the tank-side relative pressure is less than a first threshold. The first threshold may be a non-zero pressure value above which the fuel tank pressure may approach a mechanical limit of the fuel tank. Therefore, in order to prevent fuel tank degradation, the fuel tank may be reduced to a pressure that is less than the threshold. Furthermore, by maintaining the pressure of the fuel tank at a pressure that is less than the first threshold, fuel tank depressurization during a refueling event may be expedited, as will be further described below. The tank-side relative pressure (e.g., the relative pressure of the fuel tank) may be determined using the dP sensor, with the dP sensor outputting a signal corresponding to the pressure difference between the fuel system and the evaporative emissions system (e.g., a pressure of the fuel tank relative to a pressure of the evaporative emissions system). With the FTIV kept normally closed and the CVV kept normally open, coupling the evaporative emissions to the atmosphere, the dP sensor reading may correspond to the tank-side pressure relative to atmospheric pressure. Therefore, the first threshold may refer to a predetermined threshold relative pressure above atmospheric pressure.

If the tank-side relative pressure is less than the first threshold, method 800 proceeds to 822 and includes maintaining operating parameters. Maintaining operating parameters may include not altering the control of fuel system and evaporative emissions system actuators, such as the CVV, the FTIV, and the CPV. For example, with the tank-side relative pressure less than the first threshold, the fuel tank may be within its nominal operating pressure range, and the fuel tank may not be vented to the evaporative emissions system. Therefore, the FTIV may not be actuated open and will remain closed, for example. Following 822, method 800 ends.

If the tank-side relative pressure is not less than the first threshold (e.g., the tank-side relative pressure is greater than or equal to the first threshold), method 800 proceeds to 808 and includes opening the CPV and adjusting the first threshold based on the new dP sensor measurement. By opening the CPV and maintaining the CVV open, vacuum from an intake manifold of the engine due to natural engine aspiration may be routed to the fuel vapor storage canister (e.g., fuel vapor storage canister 222 of FIG. 2), drawing fresh air from the atmosphere through a vent in the evaporative emissions system (e.g., vent 227 of FIG. 2) and through the fuel storage vapor canister. By drawing fresh air across the fuel vapor storage canister, stored fuel vapor may be desorbed and routed to the engine intake. Further, with the CPV open and the intake manifold drawing vacuum on the evaporative emissions system, the canister-side will no longer be at atmospheric pressure, causing the dP sensor measurement to change. For example, the pressure difference between the canister-side of the FTIV and the fuel tank-side of the FTIV may increase as the canister-side pressure drops below atmospheric pressure. As a result, the first threshold may be increased by a corresponding amount. As an explanatory example, if the threshold was 10 in $H_2O$ with the canister-side at atmospheric pressure and the dP sensor reading increases from 15 in $H_2O$ prior to the CPV opening to 23 in $H_2O$ after the CPV is opened, a 8 in $H_2O$ differential pressure increase, the threshold may be increased to 18 in $H_2O$. In this way, the first threshold may remain relative to the tank-side pressure. The tank-side pressure being greater than or equal to the first threshold is a first example of a fuel tank depressurization condition, the fuel tank depressurization condition referring to a condition of the fuel tank, such as a pressure of the fuel tank, that warrants venting of the fuel tank to reduce the pressure (e.g., depressurizing the fuel tank).

In some examples, additionally or alternatively, the first threshold may be adjusted based on MAP, which may be measured by a MAP sensor (e.g., MAP sensor 240 of FIG. 2). For example, changes in MAP may affect the canister-side pressure. Therefore, the controller may adjust the first threshold based on MAP, with the first threshold increasing as MAP decreases (e.g., the pressure difference between the canister-side and the tank-side may increase as manifold vacuum increases), for example.

At 810, method 800 includes pulsing the FTIV open and closed. Each time the FTIV is opened, the evaporative emissions system will draw vacuum on the fuel system, resulting in a decreased differential pressure after every opening of the FTIV (e.g., the tank-side pressure becomes more similar to the canister-side pressure). In this way, fuel tank pressure may be relieved. With the CPV open, fuel vapors from the fuel tank may be purged to the engine intake for combustion instead of stored in the fuel vapor storage canister (as it may be configured to only store fuel vapors during fuel tank refueling events). In some examples, while the CPV is opened, a compensation factor may be determined in order to adjust a fuel command to correct for the induction of fuel vapors in order to maintain a desired air-fuel ratio (AFR). For the example, a fuel vapor concentration may be determined based on output from an oxygen sensor, a hydrocarbon sensor, or any sensor that may give an indication of fuel vapor concentration. In some examples, pulsing the FTIV open and closed may include opening and closing the FTIV at a predetermined duty cycle.

Each time the FTIV is opened, the dP sensor will measure a differential pressure at or near zero, as the pressure at the first pressure port of the dP sensor may be substantially equal to the pressure at the second pressure port of the dP sensor with the FTIV open. Therefore, at 812, method 800 includes measuring the tank-side relative pressure while the FTIV is closed. For example, as the FTIV is opened and closed during the pulsing, each time the FTIV is closed, the differential pressure measurement output by the dP sensor may be used to determine the tank-side pressure relative to the canister-side pressure. Similarly, the differential pressure measurement output by the dP sensor while the FTIV is open may not be used to determine the relative tank-side pressure. Further, in some examples, a rate (or a duty cycle) of the pulsing may be adjusted (for example, from the predetermined duty cycle) based on the differential pressure measured while the FTIV is closed. Adjusting the rate of the FTIV pulsing may include adjusting a duration of each pulse and/or an interval between consecutive pulses. For example, the controller may input the fuel tank relative pressure (determined from the differential pressure) and the first threshold into a look-up table, algorithm, or equation and output a corresponding rate (or duty cycle) of the pulsing. As an example, the rate of the FTIV pulsing may decrease as the fuel tank relative pressure approaches the first threshold.

At 814, it is determined if the tank-side relative pressure is less than the first threshold (as adjusted at 808). As described above, the tank-side relative pressure may be measured by the dP sensor coupled across the FTIV while the FTIV is closed. If the tank-side relative pressure is not less than the first threshold, meaning that the tank-side still has excess pressure to relieve (and the fuel tank depressurization condition is still present), method 800 returns to 810 and includes pulsing the FTIV open and closed. If instead the tank-side relative pressure is less than the first threshold, method 800 proceeds to 816 and includes closing (or maintaining closed) the FTIV. With the tank-side relative pressure less than the first threshold, the fuel tank may be in its nominal operating pressure range (and the fuel tank depressurization condition is no longer present). By closing the FTIV, the fuel system will again be isolated from the evaporative emissions system, with venting of the fuel tank discontinued.

At 818, method 800 includes closing the CPV. With the CPV closed, the evaporative emissions system will be isolated from the intake manifold, and vacuum will no longer be drawn on the evaporative emissions system. The evaporative emissions system may re-equilibrate to atmospheric pressure through the vent and the open CVV. Following 818, method 800 ends.

Returning to 804, if instead the engine is off, method 800 proceeds to 820 and includes determining if a fuel tank refueling event is requested. The refueling event may be requested by a vehicle operator, such as by depressing a refueling button on an instrument panel of the vehicle (e.g., refueling button 197 of FIG. 1). Thus, the controller may receive the request for the refueling event from the vehicle operator via the refueling button.

If a refueling event is not requested, method 800 proceeds to 822 and includes maintaining operating parameters. For example, the fuel tank will not be depressurized for a refueling event. Thus, the FTIV will not be actuated open and will remain closed. Following 822, method 800 ends.

If a refueling event is requested, method 800 proceeds to 824 and includes determining if the tank-side is pressurized. For example, the tank-side pressure relative to the canister-side pressure may be measured using the dP sensor. With the canister-side vented to the atmosphere through the open CVV, the dP sensor measurement may indicate the tank-side pressure relative to atmospheric pressure. If the dP sensor measurement indicates that the tank-side pressure is greater than the canister-side (e.g., atmospheric) pressure, then it may be determined that the tank-side is pressurized. As another example, it may be determined that the tank-side is pressurized if the tank-side relative pressure is greater than or equal to a second threshold, which may be less than the first threshold. The second threshold may refer to a second (smaller) non-zero predetermined threshold relative pressure above atmospheric pressure, such that if the tank-side relative pressure is greater than or equal to the second threshold, the tank-side is pressurized with respect to atmospheric pressure. The tank-side pressure being greater than or equal to the second threshold with the refueling event requested is a second example of a fuel tank depressurization condition.

If the tank-side is pressurized (e.g., the tank-side relative pressure is greater than or equal to the second threshold), method 800 proceeds to 826 and includes pulsing the FTIV open and closed. The FTIV may be pulsed open and closed as described at 810, for example, in order to vent (e.g., depressurize) the fuel tank. Each time the FTIV is opened, fuel vapors may flow from the fuel tank to the fuel vapor storage canister (e.g., through conduit 231, as shown in FIG. 2), where they may be adsorbed by adsorbent in the fuel vapor storage canister. Further, as the fuel vapors flow from the fuel tank to the fuel vapor storage canister through the open FTIV, the tank-side pressure decreases.

At 828, method 800 includes measuring the tank-side relative pressure while the FTIV is closed, as described above, at 812. Each time the FTIV is closed, the differential pressure measurement by the dP sensor may be used to determine the tank-side pressure relative to the canister-side pressure. Further, the tank-side relative pressure measured while the FTIV is closed (and not while the FTIV is open) may be used to adjust the pulsing, as also described above. The method may then return to 824 to determine if the tank-side is pressurized. Once the tank-side is not pressurized (e.g., the tank-side relative pressure is less than the second threshold, as measured while the FTIV is closed), method 800 proceeds to 830.

With the fuel tank depressurized (e.g., the depressurization condition is no longer present), at 830, method 800 includes commanding (or maintaining) the FTIV open. By opening the FTIV and maintaining it open, refueling vapors may be routed to the fuel vapor storage canister. Further, the CPV may remain closed throughout the depressurization and refueling process, preventing fuel vapors from flowing to the intake manifold.

At 832, method 800 includes unlocking the fuel door to allow refueling. For example, the fuel door may be kept locked and closed until the fuel tank is depressurized to prevent access to a refueling port (e.g., refueling port 284 of FIG. 2), thereby disabling refueling until the fuel tank has been depressurized. With the fuel door unlocked, a vehicle operator may open the fuel door and access the refueling port to refill the fuel tank. The FTIV may remain open throughout the refueling operation to allow refueling vapors to be vented to the fuel vapor storage canister, such as fuel vapors that are displaced by liquid fuel.

At 834, it is determined if the refueling event is complete. In one example, it may be determined that the refueling event is complete when the vehicle operator has closed the fuel door, which may be indicated to the controller by a sensor, for example. If the refueling event is not complete, such as if the fuel door remains open, method 800 proceeds to 836 and includes continuing the refueling operation. As such, the fuel door will not be locked, and the FTIV will remain open. If the refueling event is complete, method 800 proceeds to 838 and includes locking the fuel door. As such, further fuel tank refilling may be disabled until a subsequent refueling event is requested.

At 840, method 800 includes closing the FTIV. With the FTIV closed, the fuel system may again be isolated from the evaporative emissions system. Closing the FTIV seals the fuel tank, preventing further fuel vapors from flowing to the fuel vapor storage canister. Following 840, method 800 ends.

Thus, in one example, method 800 of FIG. 8 may include determining a depressurization condition of a fuel tank included in an engine system and coupled to an evaporative emissions system via a FTIV, and in response thereto, venting the fuel tank to the evaporative emissions system by pulsing the FTIV open and closed; and determining when the depressurization condition is no longer present and in response thereto, discontinuing the pulsing. In some examples, venting the fuel tank occurs while or the depressurization condition, and discontinuing the pulsing occurs while the depressurization condition is not present. As a first example, the depressurization condition is determined while the engine is on and in response to a relative pressure of the fuel tank being greater than or equal to a first, higher threshold pressure, as measured by a dP sensor coupled across the FTIV while the FTIV is closed and not while the FTIV is open. In the first example, discontinuing the pulsing includes maintaining the FTIV closed. As a second example, the depressurization condition is determined while the engine is off, in response to the relative pressure of the fuel tank being greater than or equal to a second, lower threshold pressure, and further in response to receiving a request for a refueling event. In the second example, discontinuing the pulsing includes maintaining the FTIV open.

Further, instructions stored in memory may include determining the depressurization condition from a dP sensor coupled across the FTIV while the FTIV is closed (and independent of the dP sensor measurement while the FTIV is open), and in response, performing at least one of pulsing the FTIV open and closed by instructions for sending a signal to the FTIV and opening a CPV of the evaporative emissions system by instructions for sending a different signal to the CPV. In some examples, the method may include determining whether to perform one or more of each of actions sending the signal to the FTIV and opening the CPV based on a determination of whether the engine is on or off and a determination of whether a fuel tank refueling event is requested.

As illustrated by examples herein, the method of operating and performing actions responsive to a determination of a fuel tank depressurization condition may include operating in that condition (e.g., operating with the vehicle traveling and the engine combusting or with the vehicle and/or the engine at rest), determining whether that condition is present (such as based on output of the dP sensor being greater than a threshold), and performing actions in response thereto, as well as operating without that condition present, determining that the condition is not present, and performing a different action in response thereto. For example, in response to the fuel tank depressurization condition being present, the fuel tank may be vented by pulsing the FTIV open and closed, with the pulsing adjusted based on the output of the dP sensor, and in response to the fuel tank depressurization not being present, the FTIV may be maintained closed. In another example, in response to transitioning from the fuel tank depressurization condition being present to the fuel tank depressurization not being present and further in response to a fuel tank refueling event being requested, the FTIV may be maintained open and a fuel door may be unlocked to enable access to the fuel tank.

Next, FIG. 9 shows an example timeline 900 for determining if a fuel tank isolation valve (e.g., FTIV 236 of FIG. 2) or a fuel tank-side of the FTIV is degraded in an engine system. For example, a controller (e.g., controller 12 of FIG. 2) may utilize output from a delta pressure sensor coupled across the FTIV, such as dP sensor 221 of FIG. 2, to "passively" diagnose the FTIV and the tank-side of the FTIV, such as according to example method of FIG. 3. As described with respect to FIG. 2, when closed, the FTIV isolates a fuel system, including a fuel tank, from an evaporative emissions system, including a fuel vapor storage canister. A first pressure port of the dP sensor is coupled to the tank-side of the FTIV, while a second pressure port of the dP sensor is coupled to the canister-side of the FTIV. The signal output by the dP sensor corresponds to the difference in pressure at the first pressure port and the second pressure port (e.g., between the tank-side and the canister-side of the FTIV, when closed). Thus, the controller may interpret the dP sensor measurement to determine whether to perform an active diagnostic test, such as the example method of FIG. 4, to determine if degradation of the FTIV or the tank-side is present.

The dP sensor measurement (e.g., the differential pressure measured by the dP sensor) is shown in plot 902, a position of a canister purge valve of the evaporative emissions system (e.g., CPV 212 of FIG. 2) is shown in plot 904, a position of the FTIV is shown in plot 906, a position of a canister vent valve of the evaporative emissions system (e.g., CVV 214 of FIG. 2) is shown in plot 908, an activation state of a vacuum pump of the evaporative emissions system (e.g., vacuum pump 238 of FIG. 2) is shown in plot 910, an indication of FTIV degradation is shown in plot 912, and an indication of tank-side degradation is shown in plot 914. For all of the above, the horizontal axis represents time, with time increasing along the horizontal axis from left to right. The vertical axis represents each labeled parameter. For plot 902, the dP sensor differential pressure measurement increases along the vertical axis from bottom to top. As noted, positive values (e.g., values above the horizontal axis) indicate the tank-side pressure ($P_{tank}$) is greater than the canister-side pressure ($P_{canister}$), whereas negative values (e.g., values below the horizontal axis) indicate the tank-side pressure is less than the canister-side pressure. For plots 904, 906, and 908, the vertical axis represents whether each valve (the CPV, the FTIV, and the CVV, respectively) is open or closed, with the labeled closed position being fully closed and the labelled open position being fully open in this example. For plot 910, the vertical axis represents whether the vacuum pump is on (activated) or off (deactivated). For plots 912 and 914, the vertical axis represents whether degradation of the FTIV or the tank-side, respectively is indicated ("yes" or "no"). Furthermore, dashed line 916a indicates a positive pass threshold for the FTIV and tank-side "passive" diagnostic, dashed line 916b indicates a negative pass threshold for the FTIV and tank-side "passive" diagnostic, dashed line 918 indicates a tank-side vacuum threshold, and dashed line 920 indicates a tank-side relative pressure bleed-up threshold.

Throughout the example timeline 900 of FIG. 9, the engine is off (e.g., at rest, without combustion occurring within engine cylinders). Prior to time t1, the differential pressure (plot 902) between the tank-side and the canister-side of the FTIV is greater than the positive pass threshold (dashed line 916a), indicating that the tank-side pressure is greater than the canister-side pressure. With the differential pressure above the positive pass threshold, the controller may determine that the fuel tank is isolated from the atmosphere. For example, with the FTIV closed (plot 906) and the CVV open (plot 908), the tank-side of the FTIV is isolated from the canister-side of the FTIV, which is coupled to the atmosphere through the open CVV (and therefore at atmospheric pressure). Furthermore, because the tank-side has a pressure that is not equal to atmospheric pressure, it may be inferred that the tank-side is not degraded and coupled to the atmosphere through a disconnection or orifice, for example. Therefore, prior to time t1, the "passive" diagnostic indicates that FTIV and tank-side degradation is not detected.

At time t1, the dP sensor measurement (plot 902) passes below the positive pass threshold (dashed line 916a). With the tank-side pressure nearing the canister-side pressure, the "passive" diagnostic can no longer confirm that the FTIV and the tank-side of the FTIV are not degraded. As a result, at time t2, the CVV is commanded closed (plot 908) and the vacuum pump is activated (plot 910) while the CPV remains closed (plot 904). With the CVV and the CPV both closed, the vacuum pump evacuates the canister-side of the FTIV to a target amount of vacuum. As shown in plot 902, the differential pressure increases as the canister-side pressure decreases due to a difference between the tank-side pressure and the canister-side pressure increasing. The fact that the pressure differential increases while the canister-side is evacuated indicates that the FTIV is closed, as commanded (plot 906). Thus, the indication of FTIV degradation remains off (plot 912). However, if the FTIV were degraded and stuck open, for example, the differential pressure may remain substantially equal to zero, as indicated by dotted segment 902*a*. Thus, if the differential pressure remains between the positive pass threshold and the negative pass threshold while the canister-side is evacuated, FTIV degradation is indicated (dotted segment 912*a*).

Once the canister-side reaches the target amount of vacuum, at time t3, the FTIV is opened and closed at a predetermined duty cycle until the tank-side relative pressure decreases by a threshold amount. For example, the tank-side relative pressure may have decreased by the threshold amount when dP sensor measurement is at or below the tank-side evacuation threshold (dashed line 918), which refers to a threshold amount of pressure decrease on the tank-side. Each time the FTIV is opened, the canister-side draws vacuum on the tank-side, resulting in a decreased differential pressure after every opening of the FTIV (e.g., the tank-side pressure becomes more similar to the canister-side pressure). Furthermore, each time the FTIV is opened, the dP sensor reads a differential pressure at or near zero, as the pressure at the first pressure port of the dP sensor may be approximately equal to the pressure at the second pressure port of the dP sensor while the FTIV is open. Therefore, the differential pressure may be evaluated while the FTIV is closed.

At time t4, in response to the differential pressure (plot 902) decreasing below the tank-side evacuation threshold (dashed line 918), the FTIV is held closed (plot 906), the vacuum pump is deactivated (plot 910), and the CVV is opened (plot 908). With the vacuum pump off and the CVV open, the canister-side of the FTIV is coupled to the atmosphere, whereas the tank-side of the FTIV remains sealed and under vacuum. The canister-side pressure increases above the tank-side pressure, and so the differential pressure drops below the horizontal axis, as shown in plot 902.

Once the canister-side re-equilibrates to atmospheric pressure and the dP sensor measurement stabilizes, at time t5, the tank-side pressure bleed-up threshold (dashed line 920) is set based on the current dP sensor measurement and an allowable increase in tank-side relative pressure for a sealed fuel system. With the canister-side coupled to the atmosphere, the canister-side pressure remains stable. Therefore, changes in the differential pressure may be attributed to changes in the tank-side pressure. For example, the tank-side pressure bleed-up may be monitored for a duration, with the duration ending at time t7. As shown in plot 902, the differential pressure (and therefore the tank-side relative pressure) remains below the tank-side pressure bleed-up threshold (dashed line 920), indicating that the fuel tank-side of the FTIV is holding vacuum. As a result, tank-side degradation is not indicated (plot 914). If instead the differential pressure (e.g., the tank-side relative pressure) surpassed the tank-side pressure bleed-up threshold before the duration has elapsed at time t7, such as illustrated by dashed segment 902*b* reaching the tank-side pressure bleed-up threshold at time t6, tank-side degradation may be indicated, as shown by dashed segment 914*b*.

Next, FIG. 10 shows an example timeline 1000 for determining if a fuel vapor storage canister-side of a fuel tank isolation valve (e.g., FTIV 236 of FIG. 2) is degraded in an engine system via a canister-side engine-off test. For example, a controller (e.g., controller 12 of FIG. 2) may utilize output from a delta pressure sensor coupled across the FTIV, such as dP sensor 221 of FIG. 2, to determine if degradation (e.g., a disconnection, orifice, etc.) is present in the canister-side that may lead to undesired evaporative emissions, such as according to the example method of FIG. 5. As described with respect to FIG. 2, when closed, the FTIV isolates a fuel system, including a fuel tank, from an evaporative emissions system, including the fuel vapor storage canister (e.g., fuel vapor storage canister 222 of FIG. 2). A first pressure port of the dP sensor is coupled to the tank-side of the FTIV, while a second pressure port of the dP sensor is coupled to the canister-side of the FTIV. The signal output by the dP sensor corresponds to the difference in pressure at the first pressure port and the second pressure port (e.g., between the tank-side and the canister-side of the FTIV, when closed). Thus, the controller may use the dP sensor measurement to determine whether the canister-side can hold vacuum, as will be described below.

The dP sensor measurement (e.g., the differential pressure measured by the dP sensor) is shown in plot 1002, a position of a canister purge valve of the evaporative emissions system (e.g., CPV 212 of FIG. 2) is shown in plot 1004, a position of the FTIV is shown in plot 1006, a position of a canister vent valve of the evaporative emissions system (e.g., CVV 214 of FIG. 2) is shown in plot 1008, an activation state of a vacuum pump of the evaporative emissions system (e.g., vacuum pump 238 of FIG. 2) is shown in plot 1010, and an indication of canister-side degradation is shown in plot 1012. For all of the above, the horizontal axis represents time, with time increasing along the horizontal axis from left to right. The vertical axis represents each labeled parameter. For plot 1002, the dP sensor differential pressure measurement increases along the vertical axis from bottom to top. As noted, positive values (e.g., values above the horizontal axis) indicate the tank-side pressure ($P_{tank}$) is greater than the canister-side pressure ($P_{canister}$), whereas negative values (e.g., values below the horizontal axis) indicate the tank-side pressure is less than the canister-side pressure. For plots 1004, 1006, and 1008, the vertical axis represents whether each valve (the CPV, the FTIV, and the CVV, respectively) is open or closed. For plot 1010, the vertical axis represents whether the vacuum pump is on (activated) or off (deactivated). For plot 1012, the vertical axis represents whether degradation of the canister-side of the FTIV is indicated ("yes" or "no"). Furthermore, dashed line 1014 indicates a canister-side evacuation (e.g., vacuum) threshold, and dashed line 1016 indicates a canister-side relative pressure bleed-up threshold.

Throughout the example timeline 1000 of FIG. 10, the engine is off (e.g., at rest, without combustion occurring within engine cylinders). In the example of FIG. 10, prior to time t1, the canister-side pressure is greater than the tank-side pressure, as the differential pressure measurement is below the horizontal axis (plot 1002).

At time t1, conditions for performing the canister-side engine-off test are met, as described with respect to FIG. 5, such as no indication of FTIV degradation. Therefore, the CVV (plot 1008) is closed, isolating the canister-side from the atmosphere, while the CPV (plot 1004) and the FTIV (plot 1006) are maintained closed. Thus, at time t1, the canister-side of the FTIV (e.g., the evaporative emissions system) is sealed. Also at time t1, the vacuum pump is activated (plot 1010) in order to decrease the canister-side relative pressure by a threshold amount, which may be met when the dP sensor measurement reaches the canister-side evacuation threshold (dashed line 1014). Because the tank-side pressure is not expected to appreciably change during the canister-side engine off diagnostic test, any changes in the dP sensor measurement (plot 1002) may be attributed to changes in the canister-side relative pressure.

Between time t1 and time t2, with the vacuum pump activated and evacuating the sealed evaporative emissions system, the canister-side pressure decreases. First, the differential pressure decreases as the canister-side pressure approaches the (lower) tank-side pressure, and then, once the canister-side pressure decreases below the tank-side pressure (e.g., passes through the horizontal axis), the differential pressure again increases as the canister-side relative vacuum increases.

At time t2, the differential pressure (plot 1002) reaches the canister-side evacuation threshold (dashed line 1014), showing that the canister-side pressure has decreased by the threshold amount. Thus, the vacuum pump is deactivated (plot 1010), and the canister-side pressure bleed-up threshold (dashed line 1016) is set based on the current dP sensor measurement and an allowable increase in canister-side relative pressure for a sealed evaporative emissions system. The controller may interpret the positive differential pressure measurement (plot 1002) as negative canister-side pressure (e.g., vacuum) with respect to the tank-side pressure. Therefore, a decrease in the differential pressure may be interpreted as an increase in the canister-side relative pressure. With the tank-side pressure substantially constant, changes in the differential pressure may be attributed to changes in the canister-side pressure. The canister-side pressure bleed-up may be monitored for a duration, for example, with the duration ending at time t4.

As illustrated by the differential pressure measurement (plot 1002) remaining above the canister-side pressure bleed-up threshold (dashed line 1016), the canister-side relative pressure is less than the canister-side pressure bleed-up threshold, showing that the canister-side of the FTIV is holding vacuum. As a result, canister-side degradation is not indicated (plot 1012). If instead the canister-side relative pressure surpassed the canister-side pressure bleed-up threshold before the duration has elapsed at time t4, such as indicated by dashed segment 1002*a* reaching the canister-side pressure bleed-up threshold at time t3, canister-side degradation may be indicated, as shown by dashed segment 1012*a*.

At time t4, the CVV is opened (plot 1008), coupling the evaporative emissions system to the atmosphere. Thus, the canister-side re-equilibrates to atmospheric pressure. The dP sensor measurement (plot 1002) decreases as the amount of canister-side vacuum decreases and the canister-side pressure approaches the tank-side pressure. Then, as the canister-side pressure surpasses the tank-side pressure, the differential pressure measurement drops below the horizontal axis. The differential pressure measurement may return to approximately the starting differential pressure measurement (e.g., the differential pressure prior to the canister-side engine-off diagnostic test at time t1), for example.

However, the canister-side engine-off test may not detect blockages present in the evaporative emissions system. Therefore, the controller may use the vacuum generated by natural engine aspiration to perform engine-on tests to evaluate for evaporative emissions system blockages, as described with respect to FIGS. 6-7.

For example, FIG. 11 shows a timeline 1100 for evaluating a purge path of an evaporative emissions system (e.g., evaporative emissions system 219 of FIG. 2) that couples the evaporative emissions system to an intake manifold of an engine, including a purge line (e.g., purge line 228 of FIG. 2) and a canister purge valve (e.g., CPV 212 of FIG. 2) disposed within the purge line. A controller (e.g., controller 12 of FIG. 2) may utilize output from a delta pressure sensor coupled across a FTIV, such as dP sensor 221 of FIG. 2, to detect blockages in the purge path, such as according to example method of FIG. 6. As described with respect to FIG. 2, while closed, the FTIV isolates a fuel system, including a fuel tank, from an evaporative emissions system, including a fuel vapor storage canister (e.g., fuel vapor storage canister 222 of FIG. 2). A first pressure port of the dP sensor is coupled to the tank-side of the FTIV, while a second pressure port of the dP sensor is coupled to the canister-side of the FTIV. The signal output by the dP sensor corresponds to the difference in pressure at the first pressure port and the second pressure port (e.g., between the tank-side and the canister-side of the FTIV, when closed). Thus, the controller may use the dP sensor measurement to determine whether blockages are present in the purge path that may degrade purging the fuel vapor storage canister to the intake manifold.

The dP sensor measurement (e.g., the differential pressure measured by the dP sensor) is shown in plot 1102, a position of the CPV is shown in plot 1104, a position of the FTIV is shown in plot 1106, a position of a canister vent valve of the evaporative emissions system (e.g., CVV 214 of FIG. 2) is shown in plot 1108, and an indication of a purge path blockage is shown in plot 1110. For all of the above, the horizontal axis represents time, with time increasing along the horizontal axis from left to right. The vertical axis represents each labeled parameter. For plot 1102, the dP sensor differential pressure measurement increases along the vertical axis from bottom to top. As noted, positive values (e.g., values above the horizontal axis) indicate the tank-side pressure ($P_{tank}$) is greater than the canister-side pressure ($P_{canister}$), whereas negative values (e.g., values below the horizontal axis) indicate the tank-side pressure is less than the canister-side pressure. For plots 1104, 1106, and 1108, the vertical axis represents whether each valve (the CPV, the FTIV, and the CVV, respectively) is open or closed. For plot 1110, the vertical axis represents whether a purge path blockage is detected ("yes" or "no"). Furthermore, dashed line 1112 indicates a canister-side relative vacuum threshold.

Throughout the example timeline 1100 of FIG. 11, the engine is on, with an engine speed above zero and combustion occurring within engine cylinders. Further, the engine is operating with natural aspiration, resulting in a manifold air pressure (MAP) that is less than atmospheric pressure (e.g., manifold vacuum). Prior to time t1, the CPV is closed (plot 1104), isolating the evaporative emissions system from the engine intake manifold, and the FTIV is closed (plot 1106), isolating the canister-side of the FTIV from the fuel tank-side of the FTIV. Furthermore, the CVV is open (plot 1108), coupling the canister-side to the atmosphere. Thus, the canister-side is at atmospheric pressure. As shown in plot 1102, prior to time t1, the dP sensor measurement (plot 1102) indicates that the tank-side pressure is greater than the canister-side pressure. Thus, the fuel tank pressure is higher than atmospheric pressure.

At time t1, conditions for evaluating the purge path are met, as described with respect to FIG. 6, such as no indication of FTIV degradation. Thus, the CPV is commanded open (plot 1104), coupling the canister-side to the intake manifold, while the CVV is commanded closed (plot 1108), isolating the canister-side from the atmosphere. As a result, the intake manifold draws vacuum on the evaporative emissions system, and fresh air is not drawn into the evaporative emissions system through a vent and the CVV. Also at time t1, the canister-side relative vacuum threshold (dashed line 1112) is set based on the differential pressure measurement just prior to closing the CVV and opening the CPV and a minimum amount of vacuum that the canister-side would achieve with no purge path blockages present, which may be further based on MAP.

After time t1, the canister-side relative vacuum is monitored. The canister-side relative vacuum may be determined from the dP sensor measurement (plot 1102). For example, as the intake manifold draws vacuum on the evaporative emissions system, the difference in pressure between the canister-side of the FTIV and the tank-side of the FTIV may increase. Although the tank-side pressure may fluctuate, such as due to diurnal temperatures, the tank-side pressure is not expected to appreciably change during the purge path evaluation. Therefore, changes in the differential pressure measured by the dP sensor may be attributed to changes in the canister-side pressure, and the controller may interpret an increase in differential pressure as an increase in the canister-side relative vacuum (e.g., a decrease in the canister-side relative pressure).

At time t2, the canister-side relative vacuum reaches the canister-side relative vacuum threshold (dashed line 1112), as shown by the dP sensor measurement (plot 1102) reaching the canister-side relative vacuum threshold. Therefore, the intake manifold is able to draw sufficient vacuum on the evaporative emissions system, and a purge path blockage is not indicated (plot 1110). With the purge path evaluation complete, the CPV is commanded closed (plot 1104) to isolate the evaporative emissions system from the intake manifold, and the CVV is commanded open (plot 1108) to couple the evaporative emissions system to the atmosphere. The canister-side pressure re-equilibrates to atmospheric pressure, as shown by the dP sensor measurement (plot 1102) decreasing as the canister-side vacuum decreases. The differential pressure measurement may return to approximately the starting differential pressure measurement (e.g., the differential pressure prior to the purge path evaluation at time t1), for example.

If instead the purge path is blocked, the intake manifold may not draw sufficient vacuum on the canister-side to reach the canister-side relative vacuum threshold (dashed line 1112) within a threshold duration. For example, as shown by dashed segment 1102a, the differential pressure (and therefore, the canister-side relative vacuum) may remain below the canister-side relative vacuum threshold. The controller may continue to monitor the canister-side relative vacuum until the threshold duration elapses at time t3, at which time a purge path blockage is indicated (dashed segment 1110a). While the canister-side relative vacuum continues to be monitored, prior to time t3, the CPV will remain open (dashed segment 1104a) and the CVV will remain closed (dashed segment 1108a).

FIG. 12 shows an example timeline 1200 for evaluating a vent path of an evaporative emissions system (e.g., evaporative emissions system 219 of FIG. 2) that couples the evaporative emissions system to the atmosphere, including a vent (e.g., vent 227 of FIG. 2) and a canister vent valve (e.g., CVV 214 of FIG. 2) disposed within the vent. For example, a controller (e.g., controller 12 of FIG. 2) may utilize output from a delta pressure sensor coupled across a FTIV, such as dP sensor 221 of FIG. 2, to detect blockages in the vent path, such as according to example method of FIG. 7. As described with respect to FIG. 2, when closed, the FTIV isolates a fuel system, including a fuel tank, from an evaporative emissions system, including a fuel vapor storage canister (e.g., fuel vapor storage canister 222 of FIG. 2). A first pressure port of the dP sensor is coupled to the tank-side of the FTIV, while a second pressure port of the dP sensor is coupled to the canister-side of the FTIV. The signal output by the dP sensor corresponds to the difference in pressure at the first pressure port and the second pressure port (e.g., between the tank-side and the canister-side of the FTIV, when closed). Thus, the controller may use the dP sensor measurement to determine whether blockages are present in the vent path that may degrade purging the fuel vapor storage canister to the intake manifold as well as fuel vapor storage during tank refueling events.

The dP sensor measurement (e.g., the differential pressure measured by the dP sensor) is shown in plot 1202, a position of a canister purge valve of the evaporative emissions system (e.g., CPV 212 of FIG. 2) is shown in plot 1204, a position of the FTIV is shown in plot 1206, a position of the CVV is shown in plot 1208, and an indication of a vent path blockage is shown in plot 1210. For all of the above, the horizontal axis represents time, with time increasing along the horizontal axis from left to right. The vertical axis represents each labeled parameter. For plot 1202, the dP sensor differential pressure measurement increases along the vertical axis from bottom to top. As noted, positive values (e.g., values above the horizontal axis) indicate the tank-side pressure ($P_{tank}$) is greater than the canister-side pressure ($P_{canister}$), whereas negative values (e.g., values below the horizontal axis) indicate the tank-side pressure is less than the canister-side pressure. For plots 1204, 1206, and 1208, the vertical axis represents whether each valve (the CPV, the FTIV, and the CVV, respectively) is open or closed. For plot 1210, the vertical axis represents whether a vent path blockage is detected ("yes" or "no").

Throughout the example timeline 1200 of FIG. 12, the engine is on, with an engine speed above zero and combustion occurring within engine cylinders. Further, the engine is operating with natural aspiration, resulting in a manifold air pressure (MAP) that is less than atmospheric pressure (e.g., manifold vacuum). Prior to time t1, the CPV is closed (plot 1204), isolating the evaporative emissions system from the engine intake manifold, and the FTIV is closed (plot 1206), isolating the canister-side of the FTIV from the fuel tank-side of the FTIV. Furthermore, the CVV is open (plot 1208), coupling the canister-side to the atmosphere. Thus, the canister-side is at atmospheric pressure. As shown in plot 1202, prior to time t1, the dP sensor measurement (plot 1202) indicates that the tank-side pressure is greater than the canister-side pressure. Thus, the fuel tank pressure is higher than atmospheric pressure.

At time t1, conditions for evaluating the vent path are met, as described with respect to FIG. 7, such as no indication of FTIV degradation. Thus, the CPV is commanded open (plot 1204), coupling the canister-side to the intake manifold, while the CVV is maintained open (plot 1208). As a result, the intake manifold draws vacuum on the evaporative emissions system, and fresh air is drawn into the evaporative emissions system through the vent and the open CVV.

Beginning at time t1, the canister-side relative vacuum is monitored. The canister-side relative vacuum may be determined from the dP sensor measurement (plot 1202). For example, as the intake manifold draws vacuum on the evaporative emissions system, the difference in pressure between the canister-side of the FTIV and the tank-side of the FTIV may increase. Although the tank-side pressure may fluctuate, such as due to diurnal temperatures, the tank-side pressure is not expected to appreciably change during the vent path evaluation. Therefore, changes in the differential pressure measured by the dP sensor may be attributed to changes in the canister-side pressure, and the controller may interpret an increase in differential pressure as an increase in the canister-side relative vacuum (e.g., a decrease in the canister-side relative pressure). However, due to the open CVV and fresh air entering the evaporative emissions system through the vent path, a finite amount of vacuum may build in the evaporative emissions system, which may be less than the amount of vacuum in the intake manifold, before the evaporative emissions system reaches a pressure equilibrium and the amount of vacuum remains substantially constant. However, if the vent path is blocked, fresh air may not be drawn into the evaporative emissions system, and the vacuum may continue to build. Therefore, the controller may monitor the canister-side relative vacuum for a threshold duration.

At time t2, the threshold duration has elapsed. The canister-side relative vacuum remains constant, as shown by the dP sensor measurement (plot 1202) remaining stable at time t2 and between time t2 and time t3. Therefore, the vent path is unobstructed, with sufficient air flowing in through the vent path to replace air and vapors purged to the intake manifold, and a vent path blockage is not indicated (plot 1210). With the vent path evaluation complete, at time t3, the CPV is commanded closed (plot 1204) to isolate the evaporative emissions system from the intake manifold. The canister-side pressure re-equilibrates to atmospheric pressure, as shown by the dP sensor measurement (plot 1202) decreasing as the canister-side vacuum decreases. The differential pressure measurement may return to approximately the starting differential pressure measurement (e.g., the differential pressure prior to the vent path evaluation at time t1), for example.

If instead the vent path is blocked, the canister-side relative vacuum may continue to increase as the intake manifold draws vacuum on the canister-side and air is not drawn in through the vent path. For example, as shown by dashed segment 1202a, the differential pressure (and therefore, the canister-side relative vacuum) may continue to increase after the threshold duration has elapsed at time t2. Therefore, at time t3, a vent path blockage is indicated (dashed segment 1210a). Furthermore, with a vent path blockage present, commanding open the CVV at time t3 may not couple the evaporative emissions system to the atmosphere. In the example of FIG. 12, the canister-side remains under vacuum and does not re-equilibrate to atmospheric pressure (dashed segment 1202a). However, with the CPV closed, the manifold vacuum does not continue to evacuate the evaporative emissions system, and therefore, the canister-side relative vacuum may remain substantially constant.

As described herein, a single delta pressure sensor may not only be used to diagnose components of an evaporative emissions system and fuel system, but may also be used for fuel tank pressure control. Turning now to FIG. 13, an example timeline 1300 for controlling a pressure in a fuel tank during engine operation is shown. For example, a controller (e.g., controller 12 of FIG. 2) may utilize output from a delta pressure sensor coupled across a fuel tank isolation valve, such as dP sensor 221 of FIG. 2, to depressurize the fuel tank in response to a depressurization condition, such as according to example method of FIG. 8. The fuel tank may be a sealed fuel tank included in a PHEV, such as part of a NIRCOS, for example. As described with respect to FIG. 2, when closed, the FTIV isolates a fuel system, including the fuel tank, from an evaporative emissions system, including a fuel vapor storage canister, which may be a "refueling only" fuel vapor storage canister. A first pressure port of the dP sensor is coupled to the tank-side of the FTIV, while a second pressure port of the dP sensor is coupled to the canister-side of the FTIV. The signal output by the dP sensor corresponds to the difference in pressure at the first pressure port and the second pressure port (e.g., between the tank-side and the canister-side of the FTIV, when closed). Thus, the controller may use the dP sensor measurement to determine whether to depressurize the fuel tank.

The dP sensor measurement (e.g., the differential pressure measured by the dP sensor) is shown in plot 1302, a position of a canister purge valve of the evaporative emissions system (e.g., CPV 212 of FIG. 2) is shown in plot 1304, and a position of the FTIV is shown in plot 1306. For all of the above, the horizontal axis represents time, with time increasing along the horizontal axis from left to right. The vertical axis represents each labeled parameter. For plot 1302, the dP sensor differential pressure measurement increases along the vertical axis from bottom to top. As noted, positive values (e.g., values above the horizontal axis) indicate the tank-side pressure ($P_{tank}$) is greater than the canister-side pressure ($P_{canister}$), whereas negative values (e.g., values below the horizontal axis) indicate the tank-side pressure is less than the canister-side pressure. For plots 1304 and 1306, the vertical axis represents whether each valve (the CPV and the FTIV, respectively) is open or closed. Furthermore, a tank-side relative pressure threshold is indicated by dashed line 1308.

Throughout the example timeline 1300 of FIG. 13, the engine is on, with an engine speed above zero and combustion occurring within engine cylinders. Further, the engine is operating with natural aspiration, resulting in a manifold air pressure (MAP) that is less than atmospheric pressure (e.g., manifold vacuum). Prior to time t1, the CPV is closed (plot 1304), isolating the evaporative emissions system from the engine intake manifold, and the FTIV is closed (plot 1306), isolating the canister-side of the FTIV from the fuel tank-side of the FTIV. Furthermore, a canister vent valve of the evaporative emissions system (e.g., CVV 214 of FIG. 2) remains open throughout timeline 1300 (not shown), coupling the canister-side to the atmosphere. Thus, the canister-side is at atmospheric pressure, and the dP sensor measurement (plot 1302) indicates the tank-side pressure relative to atmospheric pressure.

As shown in plot 1302, prior to time t1, the dP sensor measurement indicates that the tank-side pressure is greater than the canister-side pressure. Thus, the fuel tank pressure is higher than atmospheric pressure. Furthermore, the tank-side relative pressure is greater than the tank-side relative pressure threshold (dashed line 1308), indicating that the fuel tank may be approaching a mechanical pressure threshold above which fuel tank degradation may occur. As a result, at time t1, the CPV is commanded open (plot 1304) so that the fuel tank pressure may be relieved.

After the CPV is opened at time t1, the dP sensor measurement (plot 1302) increases due to the intake manifold drawing vacuum on the canister-side of the FTIV, reducing the canister-side relative pressure. Therefore, the difference between the tank-side pressure and the canister-side pressure increases. Since the canister-side pressure, which is the reference pressure for the tank-side relative pressure, changes, the tank-side relative pressure threshold (dashed line 1308) is increased at time t2 to reflect the change in the differential pressure. For example, the controller may adjust the tank-side relative pressure threshold once the dP sensor measurement stabilizes after the CPV is opened.

With the adjusted tank-side relative pressure threshold set, between time t2 and time t3, the FTIV is pulsed opened and closed, such as at a predetermined duty cycle, until the differential pressure (and thereby, the tank-side relative pressure) is less than the tank-side relative pressure threshold. For example, each time the FTIV is opened, the canister-side draws vacuum on the tank-side, resulting in a decreased differential pressure after every opening of the FTIV (e.g., the tank-side pressure becomes more similar to the canister-side pressure). Furthermore, each time the FTIV is opened, the dP sensor reads a differential pressure at or near zero, as the pressure at the first pressure port of the dP sensor may be approximately equal to the pressure at the second pressure port of the dP sensor while the FTIV is open. Therefore, the differential pressure may be evaluated while the FTIV is closed.

At time t3, the dP sensor measurement (plot 1302) is less than the tank-side relative pressure threshold (dashed line 1308), indicating that the fuel tank has been sufficiently depressurized. Therefore, the FTIV is maintained closed (plot 1306) and the CPV is commanded closed (plot 1304), isolating the evaporative emissions system from the intake manifold. With the CPV closed and the CVV remaining open (not shown), the canister-side re-equilibrates to atmospheric pressure, as shown by the decrease in differential pressure (plot 1302). Furthermore, with the intake manifold no longer drawing vacuum on the canister-side, the tank-side relative pressure threshold (dashed line 1308) is returned to the starting value, which is the tank-side pressure threshold relative to atmospheric pressure. As shown in plot 1302, after the canister-side re-equilibrates to the atmosphere, the dP sensor measurement is below the tank-side relative pressure threshold and remains relatively stable.

Next, FIG. 14 shows an example timeline 1400 for depressurizing a fuel tank for a refueling event (e.g., a second example of a depressurization condition). For example, a controller (e.g., controller 12 of FIG. 2) may utilize output from a delta pressure sensor coupled across a fuel tank isolation valve, such as dP sensor 221 of FIG. 2, to depressurize the fuel tank, such as according to example method of FIG. 8. The fuel tank may be a sealed fuel tank included in a PHEV, for example. As described with respect to FIG. 2, when closed, the FTIV isolates a fuel system, including the fuel tank, from an evaporative emissions system, including a fuel vapor storage canister (e.g., fuel vapor storage canister 222 of FIG. 2), which may be a "refueling only" fuel vapor storage canister. A first pressure port of the dP sensor is coupled to the tank-side of the FTIV, while a second pressure port of the dP sensor is coupled to the canister-side of the FTIV. The signal output by the dP sensor corresponds to the difference in pressure at the first pressure port and the second pressure port (e.g., between the tank-side and the canister-side of the FTIV, when closed). Thus, the controller may use the dP sensor measurement to determine whether to depressurize the fuel tank during a refueling event.

The dP sensor measurement (e.g., the differential pressure measured by the dP sensor) is shown in plot 1402, an indication of a refueling request is shown in plot 1404, a position of the FTIV is shown in plot 1406, and a state of a fuel door is shown in plot 1408. For all of the above, the horizontal axis represents time, with time increasing along the horizontal axis from left to right. The vertical axis represents each labeled parameter. For plot 1402, the dP sensor differential pressure measurement increases along the vertical axis from bottom to top. As noted, positive values (e.g., values above the horizontal axis) indicate the tank-side pressure ($P_{tank}$) is greater than the canister-side pressure ($P_{canister}$), whereas negative values (e.g., values below the horizontal axis) indicate the tank-side pressure is less than the canister-side pressure. For plot 1404, the vertical axis represents whether a refueling event has been requested ("yes" or "no"), such as via a vehicle operator depressing a refueling button on an instrument panel (e.g., refueling button 197 of FIG. 1). For plot 1406, the vertical axis represents whether the FTIV is open or closed. For plot 1408, the vertical axis represents whether the fuel door is locked (which prevents opening of the fuel tank and refueling) or unlocked (which enables opening of the fuel tank and refueling).

Throughout the example timeline 1400 of FIG. 14, the engine is off, with the engine at rest and no combustion occurring within engine cylinders. Although not shown, it should also be understood that throughout timeline 1400, a canister purge valve (e.g., CPV 212 of FIG. 2) remains closed, isolating the evaporative emissions system from an intake manifold of the engine, and a canister vent valve (e.g., CVV 214 of FIG. 2) remains open, coupling the evaporative emissions system to the atmosphere.

Prior to time t1, the FTIV is closed (plot 1406), isolating the canister-side of the FTIV from the fuel tank-side of the FTIV, and a refueling event is not requested (plot 1404). The fuel door (e.g., fuel door 286 of FIG. 2) remains locked, preventing access to a refueling port of the fuel tank (e.g., refueling port 284 of FIG. 2). With the canister-side coupled to the atmosphere through the open CVV, the dP sensor measurement (plot 1402) indicates the tank-side pressure relative to atmospheric pressure. As shown in plot 1402, the tank-side pressure is greater than the canister-side pressure, and therefore, greater than atmospheric pressure.

At time t1, a refueling event is requested (plot 1404), such as by the vehicle operator. Because the tank-side pressure is greater than atmospheric pressure (e.g., greater than a threshold relative pressure above atmospheric pressure), the fuel door remains locked (plot 1408). In order to relieve the tank-side pressure, beginning at time t2, the fuel tank is vented by pulsing the FTIV is open and closed, such as at a predetermined duty cycle (plot 1406). Each time the FTIV is opened, fuel vapors are routed from the fuel tank to the fuel vapor storage canister, resulting in a decreased differential pressure after every opening of the FTIV (e.g., the tank-side pressure becomes more similar to the canister-side pressure). The fuel vapors are adsorbed by adsorbent within the fuel vapor canister, and clean air (e.g., without fuel vapors) exits to the atmosphere through the open vent, maintaining the canister-side at atmospheric pressure. Furthermore, each time the FTIV is opened, the dP sensor reads a differential pressure at or near zero, as the pressure at the first pressure port of the dP sensor may be approximately equal to the pressure at the second pressure port of the dP sensor while the FTIV is open. Therefore, the differential pressure may be evaluated while the FTIV is closed.

At time t3, the fuel tank is fully depressurized, with the dP sensor measurement (plot 1402) showing a differential pressure of zero while the FTIV is closed. In response to the tank-side pressure being equal to the canister-side pressure (e.g., atmospheric pressure), at time t4, the FTIV is commanded open (plot 1406) and the fuel door is unlocked (plot 1408). Thus, the vehicle operator may access the refueling port and refill the fuel tank. As fuel is added to the fuel tank, refueling vapors are routed to the fuel vapor storage canister through the open FTIV, where they are adsorbed by the adsorbent, and clean air is routed from the evaporative emissions system to the atmosphere through the open vent.

At time t5, the refueling event is complete, and thus, the refueling event is no longer requested (plot 1404). As a result, the FTIV is commanded closed (plot 1406), isolating the tank-side of the FTIV from the canister-side of the FTIV.

Thus, fuel vapors will no longer flow from the fuel tank to the fuel vapor storage canister. Additionally, the fuel door is locked (plot 1408), preventing access to the refueling port until a subsequent refueling event is requested.

In this way, a single delta pressure sensor may be used in a NIRCOS system to determine a differential pressure across a FTIV isolating a fuel tank of a fuel system from a fuel vapor storage canister of an evaporative emissions system. In particular, the differential pressure may be measured while the FTIV is closed. The differential pressure may be used to determine a relative pressure or vacuum of a fuel tank-side of the FTIV (e.g., of the fuel system) and a relative pressure or vacuum of a fuel vapor storage canister-side of the FTIV (e.g., of the evaporative emissions system). Further, the relative pressures measured by the delta pressure sensor may be used in evaporative emissions system and fuel system diagnostic tests. The technical effect of including a single delta pressure sensor coupled across a fuel tank isolation valve disposed between a fuel vapor storage canister of an evaporative emissions system and a fuel tank of a fuel system is that a differential pressure measured by the delta pressure sensor may be used to check each of the fuel tank isolation valve, the fuel system, and the evaporative emissions system for degradation. Further still, the relative pressure of the fuel system may be used for fuel tank pressure control, such as by venting the fuel tank in response to a fuel tank depressurization condition being present. By pulsing the FTIV open and closed during the venting and measuring the differential pressure only when the FTIV is closed, feedback concerning the relative pressure of the fuel tank-side of the FTIV may be maintained, resulting in controlled and efficient fuel tank depressurization. The technical effect of measuring a differential pressure of an evaporative emissions system and a fuel system with a single delta pressure sensor coupled across a fuel tank isolation valve disposed between a fuel vapor storage canister of the evaporative emissions system and a fuel tank of the fuel system while the fuel tank isolation valve is closed and not while the fuel tank isolation valve is open is that a relative fuel tank pressure may be determined from the measured differential pressure. Thereby, the single delta pressure sensor may replace two pressure sensors (one coupled to the fuel system and one coupled to the evaporative emissions system), reducing vehicle costs.

As a first example, a method comprises: differentiating degradation between each of a sealed fuel tank, an evaporative emissions system, and a fuel tank isolation valve (FTIV) based on a differential pressure measured by a delta pressure sensor coupled across the FTIV, the FTIV positioned between the sealed fuel tank and the evaporative emissions system. In the preceding example, additionally or optionally, a first pressure port of the delta pressure sensor is fluidically coupled to between the FTIV and the sealed fuel tank, and wherein a second pressure port of the delta pressure sensor is fluidically coupled to between the FTIV and a fuel vapor storage canister of the evaporative emissions system. In any or all of the preceding examples, additionally or optionally, no restricting components are coupled between the sealed fuel tank and the FTIV, and/or no restricting components are coupled between the fuel vapor storage canister and the FTIV. In any or all of the preceding examples, additionally or optionally, no restricting components are coupled between the first pressure port of the delta pressure sensor and the sealed fuel tank, and/or no restricting components are coupled between the second pressure port of the delta pressure sensor and the fuel vapor storage canister. In any or all of the preceding examples, additionally or optionally, the differentiating degradation between each of the sealed fuel tank, the evaporative emissions system, and the FTIV further includes setting respective diagnostic codes in a controller based on the differentiation and further includes differentiating degradation between the sealed fuel tank and the FTIV and not the evaporative emissions system when the differential pressure is between a positive pass threshold and negative pass threshold while the FTIV is closed and the evaporative emissions system is vented to atmosphere. In any or all of the preceding examples, additionally or optionally, the differentiating degradation between the sealed fuel tank and the FTIV and not the evaporative emissions system further comprises: actuating a vacuum pump of the evaporative emissions system to evacuate the evaporative emissions system to a target amount of vacuum; indicating degradation of the FTIV and not degradation of the sealed fuel tank in response to the differential pressure remaining between the positive pass threshold and the negative pass threshold; and performing a fuel tank pressure bleed-up test in response to the differential pressure increasing above the positive pass threshold. In any or all of the preceding examples, additionally or optionally, the fuel tank pressure bleed-up test comprises: commanding the FTIV open and closed at a predetermined duty cycle; measuring the differential pressure while the FTIV is closed; maintaining the FTIV closed in response to the differential pressure decreasing by a threshold amount; monitoring a relative pressure of the sealed fuel tank for a duration; and indicating degradation of the sealed fuel tank in response to the relative pressure of the sealed fuel tank reaching or surpassing a threshold pressure within a threshold duration. In any or all of the preceding examples, additionally or optionally, the relative pressure of the sealed fuel tank is a pressure of the sealed fuel tank relative to a pressure of the evaporative emissions system, and wherein the pressure of the sealed fuel tank relative to the pressure of the evaporative emissions system is determined from the differential pressure measured by the delta pressure sensor coupled across the FTIV. In any or all of the preceding examples, additionally or optionally, the differentiating degradation between each of the sealed fuel tank, the evaporative emissions system, and the FTIV further comprises: closing a canister vent valve to seal the evaporative emissions system from atmosphere; actuating a vacuum pump of the evaporative emissions system until a relative pressure of the evaporative emissions system decreases by a threshold amount; determining a bleed-up threshold based on the relative pressure of the evaporative emissions system; monitoring the relative pressure of the evaporative emissions system for a duration; and indicating degradation of the evaporative emissions system and not degradation of the FTIV or degradation of the sealed fuel tank in response to the relative pressure of the evaporative emissions system reaching or surpassing the bleed-up threshold within a threshold duration. In any or all of the preceding examples, additionally or optionally, the relative pressure of the evaporative emissions system is a pressure of the evaporative emissions system relative to a pressure of the sealed fuel tank, and wherein the pressure of the evaporative emissions system relative to the pressure of the sealed fuel tank is determined from the differential pressure measured by the delta pressure sensor coupled across the FTIV.

As a second example, a method for an engine comprises: indicating degradation of a fuel tank isolation valve (FTIV) coupled between a fuel tank and a fuel vapor storage canister in response to a delta pressure sensor coupled across the FTIV measuring a differential pressure of zero while the FTIV is closed and vacuum is drawn on a fuel vapor storage canister-side of the FTIV; indicating degradation of a fuel tank-side of the FTIV in response to a relative pressure of the fuel tank-side increasing above a first threshold during a fuel tank pressure bleed-up test; and indicating degradation of the fuel vapor storage canister-side of the FTIV in response to a relative pressure of the fuel vapor storage canister-side increasing above a second threshold during a canister-side engine-off test. In the preceding example, additionally or optionally, the fuel tank pressure bleed-up test comprises: drawing vacuum on the fuel vapor storage canister-side of the FTIV while the FTIV is closed; opening and closing the FTIV at a predetermined duty cycle to draw vacuum on the fuel tank-side of the FTIV by the fuel vapor storage canister-side of the FTIV; holding the FTIV closed while coupling the canister-side of the FTIV to atmosphere; and monitoring the relative pressure of the fuel tank-side of the FTIV for a duration. In any or all of the preceding examples, additionally or optionally, the relative pressure of the fuel tank-side of the FTIV is measured by the delta pressure sensor and is a pressure of the fuel tank-side relative to the fuel vapor storage canister-side of the FTIV. In any or all of the preceding examples, additionally or optionally, the canister-side engine-off test comprises: sealing the fuel vapor storage canister-side of the FTIV from atmosphere and an intake manifold of the engine; drawing vacuum on the fuel vapor storage canister-side of the FTIV while the FTIV is closed until the relative pressure of the fuel vapor storage canister-side of the FTIV decreases by a threshold amount; and monitoring the relative pressure of the fuel vapor storage canister-side of the FTIV for a duration. In any or all of the preceding examples, additionally or optionally, the relative pressure of the fuel vapor storage canister-side of the FTIV is measured by the delta pressure sensor and is a pressure of the fuel vapor storage canister-side of the FTIV relative to a pressure of the fuel tank-side of the FTIV.

As a third example, a system for a vehicle comprises: an engine system, including an engine configured to propel the vehicle by combusting air and fuel; a fuel system, including a fuel tank for storing the fuel; an evaporative emissions system in fluidic communication with the fuel system via a conduit, the conduit including a fuel tank isolation valve (FTIV), and an intake of the engine via a purge line, the evaporative emissions system including a fuel vapor storage canister; a canister vent valve positioned in a vent of the evaporative emissions system; a canister purge valve positioned in the purge line; a delta pressure sensor coupled across the FTIV, the delta pressure sensor including a first pressure port fluidically coupled to the conduit between the fuel tank and the FTIV and a second pressure port fluidically coupled to the conduit between the fuel vapor storage canister and the FTIV; and a controller storing instructions in non-transitory memory that, when executed, cause the controller to: determine a differential pressure across the FTIV based on a voltage signal output by the delta pressure sensor; determine at least one of a fuel system relative pressure and a fuel system relative vacuum based on the differential pressure across the FTIV; determine at least one of an evaporative emissions system relative pressure and an evaporative emissions system relative vacuum based on the differential pressure across the FTIV; and evaluate at least one of the FTIV and the fuel system for degradation while the engine is off based on the differential pressure across the FTIV. In the preceding example, additionally or optionally, the evaporative emissions system further comprises a vacuum pump, and wherein evaluating at least one of the FTIV and the fuel system for degradation comprises: closing the canister vent valve, maintaining closed the canister purge valve, and actuating the vacuum pump in response to a differential pressure between a positive pass threshold and a negative pass threshold while the FTIV is closed; indicating FTIV degradation in response to the differential pressure remaining between the positive pass threshold and the negative pass threshold; indicating no FTIV degradation and opening and closing the FTIV at a predetermined duty cycle in response to the differential pressure increasing above the positive pass threshold or decreasing below the negative pass threshold; maintaining the FTIV closed once the fuel system relative pressure decreases by a first threshold amount, the fuel system relative pressure measured while the FTIV is closed; monitoring the fuel system relative pressure for a first threshold duration; indicating fuel system degradation in response to the fuel system relative pressure reaching or exceeding a fuel system relative pressure threshold; and indicating no fuel system degradation in response to the fuel system relative pressure remaining below the fuel system relative pressure threshold. In any or all of the preceding examples, additionally or optionally, the controller stores further instructions in non-transitory memory that, when executed, cause the controller to: responsive to an indication of no FTIV degradation, while the engine is off, evaluate the evaporative emissions system for degradation by commanding closed the canister vent valve, maintaining the canister purge valve and the FTIV closed, evacuating the evaporative emissions system with the vacuum pump until the evaporative emissions system relative pressure decreases by a second threshold amount, and monitoring the evaporative emissions system relative pressure for a second threshold duration; indicate evaporative emissions system degradation in response to the evaporative emissions system relative pressure reaching or exceeding an evaporative emissions system relative pressure threshold; and indicate no evaporative emissions system degradation in response to the evaporative emissions system relative pressure remaining below the evaporative emissions system relative pressure threshold. In any or all of the preceding examples, additionally or optionally, the controller stores further instructions in non-transitory memory that, when executed, cause the controller to: while the engine is on, evaluate a purge path, including the purge line and the canister purge valve, for blockages by commanding closed the canister vent valve, maintaining the FTIV closed, and commanding open the canister purge valve to draw vacuum on the evaporative emissions system from an intake manifold of the engine; indicate a purge path blockage in response to the evaporative emissions system relative vacuum remaining below an evaporative emissions system relative vacuum threshold; and indicate no purge path blockage in response to the evaporative emissions system relative vacuum reaching or exceeding the evaporative emissions system relative vacuum threshold. In any or all of the preceding examples, additionally or optionally, the controller stores further instructions in non-transitory memory that, when executed, cause the controller to: while the engine is on, evaluate a vent path, including the vent and the canister vent valve, for blockages by commanding closed the canister vent valve, maintaining the FTIV closed, and commanding open the canister purge valve to draw vacuum on the evaporative emissions system from the intake manifold of the engine; indicate a vent path blockage in response to the evaporative emissions system relative vacuum continuing to increase after a third threshold duration has elapsed; and indicate no vent path blockage in response to the evaporative emissions system relative vacuum stabilizing before the third threshold duration has elapsed.

In another representation, a method comprises, while an engine is off, diagnosing degradation of at least one of a fuel tank, an evaporative emissions system, coupled to the fuel tank via a conduit, and a fuel tank isolation valve (FTIV) disposed within the conduit based on output of a delta pressure sensor coupled across the FTIV; and, while the engine is on, check for blockages in at least one of a purge path of the evaporative emissions system and a vent path of the evaporative emissions system based on output of the delta pressure sensor. As a first example, diagnosing degradation of at least one of the fuel tank, the evaporative emissions system, and the fuel tank isolation valve includes the delta pressure sensor measuring a pressure difference between the evaporative emissions system and the fuel system that is less than a threshold while vacuum is drawn on the evaporative emissions system and the FTIV is maintained closed. As a second example, checking for blockages in at least one of the purge path and the vent path includes opening a canister purge valve of the evaporative emissions system to draw vacuum on the evaporative emissions system by an intake manifold of the engine.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
   differentiating degradation between each of a sealed fuel tank, an evaporative emissions system, and a fuel tank isolation valve (FTIV) based on a differential pressure measured by a delta pressure sensor coupled across the FTIV, the FTIV positioned between the sealed fuel tank and the evaporative emissions system.

2. The method of claim 1, wherein a first pressure port of the delta pressure sensor is fluidically coupled to between the FTIV and the sealed fuel tank, and wherein a second pressure port of the delta pressure sensor is fluidically coupled to between the FTIV and a fuel vapor storage canister of the evaporative emissions system.

3. The method of claim 2, wherein no restricting components are coupled between the sealed fuel tank and the FTIV, and/or no restricting components are coupled between the fuel vapor storage canister and the FTIV.

4. The method of claim 2, wherein no restricting components are coupled between the first pressure port of the delta pressure sensor and the sealed fuel tank, and/or no restricting components are coupled between the second pressure port of the delta pressure sensor and the fuel vapor storage canister.

5. The method of claim 1, wherein the differentiating degradation between each of the sealed fuel tank, the evaporative emissions system, and the FTIV further includes setting respective diagnostic codes in a controller based on the differentiation and further includes differentiating degradation between the sealed fuel tank and the FTIV and not the evaporative emissions system when the differential pressure is between a positive pass threshold and negative pass threshold while the FTIV is closed and the evaporative emissions system is vented to atmosphere.

6. The method of claim 5, wherein the differentiating degradation between the sealed fuel tank and the FTIV and not the evaporative emissions system further comprises:
   actuating a vacuum pump of the evaporative emissions system to evacuate the evaporative emissions system to a target amount of vacuum;
   indicating degradation of the FTIV and not degradation of the sealed fuel tank in response to the differential pressure remaining between the positive pass threshold and the negative pass threshold; and
   performing a fuel tank pressure bleed-up test in response to the differential pressure increasing above the positive pass threshold.

7. The method of claim 6, wherein the fuel tank pressure bleed-up test comprises:
   commanding the FTIV open and closed at a predetermined duty cycle;
   measuring the differential pressure while the FTIV is closed;
   maintaining the FTIV closed in response to the differential pressure decreasing by a threshold amount;
   monitoring a relative pressure of the sealed fuel tank for a duration; and
   indicating degradation of the sealed fuel tank in response to the relative pressure of the sealed fuel tank reaching or surpassing a threshold pressure within a threshold duration.

8. The method of claim 7, wherein the relative pressure of the sealed fuel tank is a pressure of the sealed fuel tank relative to a pressure of the evaporative emissions system, and wherein the pressure of the sealed fuel tank relative to the pressure of the evaporative emissions system is determined from the differential pressure measured by the delta pressure sensor coupled across the FTIV.

9. The method of claim 1, wherein the differentiating degradation between each of the sealed fuel tank, the evaporative emissions system, and the FTIV further comprises:
   closing a canister vent valve to seal the evaporative emissions system from atmosphere;
   actuating a vacuum pump of the evaporative emissions system until a relative pressure of the evaporative emissions system decreases by a threshold amount;
   determining a bleed-up threshold based on the relative pressure of the evaporative emissions system;
   monitoring the relative pressure of the evaporative emissions system for a duration; and
   indicating degradation of the evaporative emissions system and not degradation of the FTIV or degradation of the sealed fuel tank in response to the relative pressure of the evaporative emissions system reaching or surpassing the bleed-up threshold within a threshold duration.

10. The method of claim 9, wherein the relative pressure of the evaporative emissions system is a pressure of the evaporative emissions system relative to a pressure of the sealed fuel tank, and wherein the pressure of the evaporative emissions system relative to the pressure of the sealed fuel tank is determined from the differential pressure measured by the delta pressure sensor coupled across the FTIV.

11. A method for an engine, comprising:
   indicating degradation of a fuel tank isolation valve (FTIV) coupled between a fuel tank and a fuel vapor storage canister in response to a delta pressure sensor coupled across the FTIV measuring a differential pressure of zero while the FTIV is closed and vacuum is drawn on a fuel vapor storage canister-side of the FTIV;
   indicating degradation of a fuel tank-side of the FTIV in response to a relative pressure of the fuel tank-side increasing above a first threshold during a fuel tank pressure bleed-up test; and
   indicating degradation of the fuel vapor storage canister-side of the FTIV in response to a relative pressure of the fuel vapor storage canister-side increasing above a second threshold during a canister-side engine-off test.

12. The method of claim 11, wherein the fuel tank pressure bleed-up test comprises:
   drawing vacuum on the fuel vapor storage canister-side of the FTIV while the FTIV is closed;
   opening and closing the FTIV at a predetermined duty cycle to draw vacuum on the fuel tank-side of the FTIV by the fuel vapor storage canister-side of the FTIV;
   holding the FTIV closed while coupling the canister-side of the FTIV to atmosphere; and
   monitoring the relative pressure of the fuel tank-side of the FTIV for a duration.

13. The method of claim 12, wherein the relative pressure of the fuel tank-side of the FTIV is measured by the delta pressure sensor and is a pressure of the fuel tank-side relative to the fuel vapor storage canister-side of the FTIV.

14. The method of claim 11, wherein the canister-side engine-off test comprises:
   sealing the fuel vapor storage canister-side of the FTIV from atmosphere and an intake manifold of the engine;
   drawing vacuum on the fuel vapor storage canister-side of the FTIV while the FTIV is closed until the relative pressure of the fuel vapor storage canister-side of the FTIV decreases by a threshold amount; and
   monitoring the relative pressure of the fuel vapor storage canister-side of the FTIV for a duration.

15. The method of claim 14, wherein the relative pressure of the fuel vapor storage canister-side of the FTIV is measured by the delta pressure sensor and is a pressure of the fuel vapor storage canister-side of the FTIV relative to a pressure of the fuel tank-side of the FTIV.

16. A system for a vehicle, comprising:
   an engine system, including an engine configured to propel the vehicle by combusting air and fuel;
   a fuel system, including a fuel tank for storing the fuel;
   an evaporative emissions system in fluidic communication with the fuel system via a conduit, the conduit including a fuel tank isolation valve (FTIV), and an intake of the engine via a purge line, the evaporative emissions system including a fuel vapor storage canister;
   a canister vent valve positioned in a vent of the evaporative emissions system;
   a canister purge valve positioned in the purge line;
   a delta pressure sensor coupled across the FTIV, the delta pressure sensor including a first pressure port fluidically coupled to the conduit between the fuel tank and the FTIV and a second pressure port fluidically coupled to the conduit between the fuel vapor storage canister and the FTIV; and
   a controller storing instructions in non-transitory memory that, when executed, cause the controller to:
      determine a differential pressure across the FTIV based on a voltage signal output by the delta pressure sensor;
      determine at least one of a fuel system relative pressure and a fuel system relative vacuum based on the differential pressure across the FTIV;
      determine at least one of an evaporative emissions system relative pressure and an evaporative emissions system relative vacuum based on the differential pressure across the FTIV; and
      evaluate at least one of the FTIV and the fuel system for degradation while the engine is off based on the differential pressure across the FTIV.

17. The system of claim 16, wherein the evaporative emissions system further comprises a vacuum pump, and wherein evaluating at least one of the FTIV and the fuel system for degradation comprises:
   closing the canister vent valve, maintaining closed the canister purge valve, and actuating the vacuum pump in response to a differential pressure between a positive pass threshold and a negative pass threshold while the FTIV is closed;
   indicating FTIV degradation in response to the differential pressure remaining between the positive pass threshold and the negative pass threshold;
   indicating no FTIV degradation and opening and closing the FTIV at a predetermined duty cycle in response to the differential pressure increasing above the positive pass threshold or decreasing below the negative pass threshold;
   maintaining the FTIV closed once the fuel system relative pressure decreases by a first threshold amount, the fuel system relative pressure measured while the FTIV is closed;

monitoring the fuel system relative pressure for a first threshold duration;

indicating fuel system degradation in response to the fuel system relative pressure reaching or exceeding a fuel system relative pressure threshold; and indicating no fuel system degradation in response to the fuel system relative pressure remaining below the fuel system relative pressure threshold.

18. The system of claim 17, wherein the controller stores further instructions in non-transitory memory that, when executed, cause the controller to:

responsive to an indication of no FTIV degradation, while the engine is off, evaluate the evaporative emissions system for degradation by commanding closed the canister vent valve, maintaining the canister purge valve and the FTIV closed, evacuating the evaporative emissions system with the vacuum pump until the evaporative emissions system relative pressure decreases by a second threshold amount, and monitoring the evaporative emissions system relative pressure for a second threshold duration;

indicate evaporative emissions system degradation in response to the evaporative emissions system relative pressure reaching or exceeding an evaporative emissions system relative pressure threshold; and indicate no evaporative emissions system degradation in response to the evaporative emissions system relative pressure remaining below the evaporative emissions system relative pressure threshold.

19. The system of claim 18, wherein the controller stores further instructions in non-transitory memory that, when executed, cause the controller to:

while the engine is on, evaluate a purge path, including the purge line and the canister purge valve, for blockages by commanding closed the canister vent valve, maintaining the FTIV closed, and commanding open the canister purge valve to draw vacuum on the evaporative emissions system from an intake manifold of the engine;

indicate a purge path blockage in response to the evaporative emissions system relative vacuum remaining below an evaporative emissions system relative vacuum threshold; and indicate no purge path blockage in response to the evaporative emissions system relative vacuum reaching or exceeding the evaporative emissions system relative vacuum threshold.

20. The system of claim 18, wherein the controller stores further instructions in non-transitory memory that, when executed, cause the controller to:

while the engine is on, evaluate a vent path, including the vent and the canister vent valve, for blockages by commanding closed the canister vent valve, maintaining the FTIV closed, and commanding open the canister purge valve to draw vacuum on the evaporative emissions system from the intake manifold of the engine;

indicate a vent path blockage in response to the evaporative emissions system relative vacuum continuing to increase after a third threshold duration has elapsed; and indicate no vent path blockage in response to the evaporative emissions system relative vacuum stabilizing before the third threshold duration has elapsed.

* * * * *